(12) United States Patent
Avadhani et al.

(10) Patent No.: US 11,593,439 B1
(45) Date of Patent: Feb. 28, 2023

(54) IDENTIFYING SIMILAR DOCUMENTS IN A FILE REPOSITORY USING UNIQUE DOCUMENT SIGNATURES

(71) Applicant: OneTrust LLC, Atlanta, GA (US)

(72) Inventors: Madan Avadhani, Palo Alto, CA (US); Swapnil Sharma, Bangalore (IN)

(73) Assignee: OneTrust LLC, Atlanta, GA (US)

( * ) Notice: Subject to any disclaimer, the term of this patent is extended or adjusted under 35 U.S.C. 154(b) by 0 days.

(21) Appl. No.: 17/664,471

(22) Filed: May 23, 2022

(51) Int. Cl.
*G06F 16/93* (2019.01)
*G06F 40/284* (2020.01)
*G06F 16/35* (2019.01)
*G06F 16/31* (2019.01)

(52) U.S. Cl.
CPC ............ *G06F 16/93* (2019.01); *G06F 16/325* (2019.01); *G06F 16/35* (2019.01); *G06F 40/284* (2020.01)

(58) Field of Classification Search
CPC ........ G06F 16/93; G06F 16/35; G06F 16/325; G06F 40/284; G06F 16/285; G06F 16/906

USPC .......................................... 707/749, 737, 758
See application file for complete search history.

(56) References Cited

U.S. PATENT DOCUMENTS

| | | | |
|---|---|---|---|
| 2006/0041597 A1* | 2/2006 | Conrad | .................. G06F 16/30 |
| 2010/0169329 A1* | 7/2010 | Frieder | .............. G06F 16/3346 707/754 |
| 2018/0060302 A1* | 3/2018 | Liang | ..................... G06F 16/35 |

\* cited by examiner

*Primary Examiner* — Evan Aspinwall
(74) *Attorney, Agent, or Firm* — Keller Preece PLLC

(57) ABSTRACT

Methods, systems, and non-transitory computer readable storage media are disclosed for determining clusters of similar digital documents using unique document signatures. Specifically, the disclosed system processes digital text in a digital document to tokenize character strings (e.g., words) in the digital document by combining a subset of character values and string lengths in the character strings. Additionally, the disclosed system generates a document signature for the digital document by combining subsets of tokens generated for the digital document into a token sequence indicative of the digital text in the digital document. The disclosed system determines a cluster of similar digital documents including the digital document by comparing the document signature of the digital document to document signatures corresponding to a plurality of digital documents.

20 Claims, 14 Drawing Sheets

|  | Top N Tokens | Bottom N Tokens | Word Count | Character Count |
|---|---|---|---|---|
| Same | Yes | Yes | Yes | Yes |
| Very Similar | Yes | Yes | No | No |
| Similar | Very High | Very High | - | - |
| Not Similar | Low | Low | - | - |

Similarity Matrix — 1000

| Document | 1 | 2 | 3 | 4 | 5 | 6 | 7 |
|---|---|---|---|---|---|---|---|
| 1 | 100 | 56 | 0 | 87 | 0 | 100 | 0 |
| 2 | 56 | 100 | 0 | 0 | 95 | 0 | 0 |
| 3 | 0 | 0 | 100 | 0 | 0 | 0 | 0 |
| 4 | 87 | 0 | 0 | 100 | 0 | 0 | 65 |
| 5 | Low | 95 | 0 | 0 | 100 | 0 | 0 |
| 6 | Low | 100 | 0 | 0 | 0 | 100 | 0 |
| 7 | Low | 0 | 65 | 0 | 0 | 0 | 100 |

IDENTIFYING SIMILAR DOCUMENTS IN A FILE REPOSITORY USING UNIQUE DOCUMENT SIGNATURES

BACKGROUND

Advances in computer processing and data storage technologies have led to significant advances in the field of text processing and document digitization. Specifically, many entities utilize document digitization processes to convert physical documents into digital documents and analyze digital documents for storing and easily accessing data in the physical/digital documents. Many industries, such as medical service providers, legal service providers, digital libraries, or digital document repositories, receive and process large numbers of physical/digital documents— sometimes including hundreds of thousands or even millions of pages per day. Analyzing digital documents, such as identifying similar documents or duplicate documents or similar content across different documents, can take a significant amount of time and computing resources. Additionally, because many entities rely on information in digitized documents, accurately analyzing and categorizing digital documents for later access via computing devices is an important, though difficult task. Conventional systems typically utilize rigid digital document/content analysis processes that require synchronous access to compared documents. Accordingly, conventional systems have difficulty extracting or redacting information that may be duplicated across similar documents without significant computational resources. Additionally, conventional systems often utilize processes that require a significant amount of computing resources and time to accurately compare digital text content.

SUMMARY

This disclosure describes one or more embodiments of methods, non-transitory computer readable media, and systems that solve the foregoing problems (in addition to providing other benefits) by determining clusters of similar digital documents using unique document signatures and identifying duplicate documents. Specifically, the disclosed systems process digital text in a digital document to tokenize character strings (e.g., words) in the digital document by combining a subset of character values and string lengths in the character strings. Additionally, the disclosed systems generate a document signature for the digital document by combining subsets of tokens generated for the digital document into a token sequence indicative of the digital text in the digital document. The disclosed systems determine a cluster of similar digital documents including the digital document by comparing the document signature of the digital document to document signatures corresponding to a plurality of digital documents. The disclosed systems thus utilize unique document signatures of digital documents to asynchronously and efficiently identify clusters of similar documents in large document repositories. Additionally, the disclosed systems can efficiently use clusters of similar documents to identify duplicate documents or modify key information from similar/duplicate documents while limiting computing resources.

BRIEF DESCRIPTION OF THE DRAWINGS

Various embodiments will be described and explained with additional specificity and detail through the use of the accompanying drawings in which:

FIG. 9 illustrates an example of a comparison diagram indicating a similarity level of digital documents based on document signatures in accordance with one or more implementations.

FIG. 10 illustrates an example of a similarity matrix of a plurality of digital documents based on document signatures in accordance with one or more implementations.

DETAILED DESCRIPTION

Figure 1:
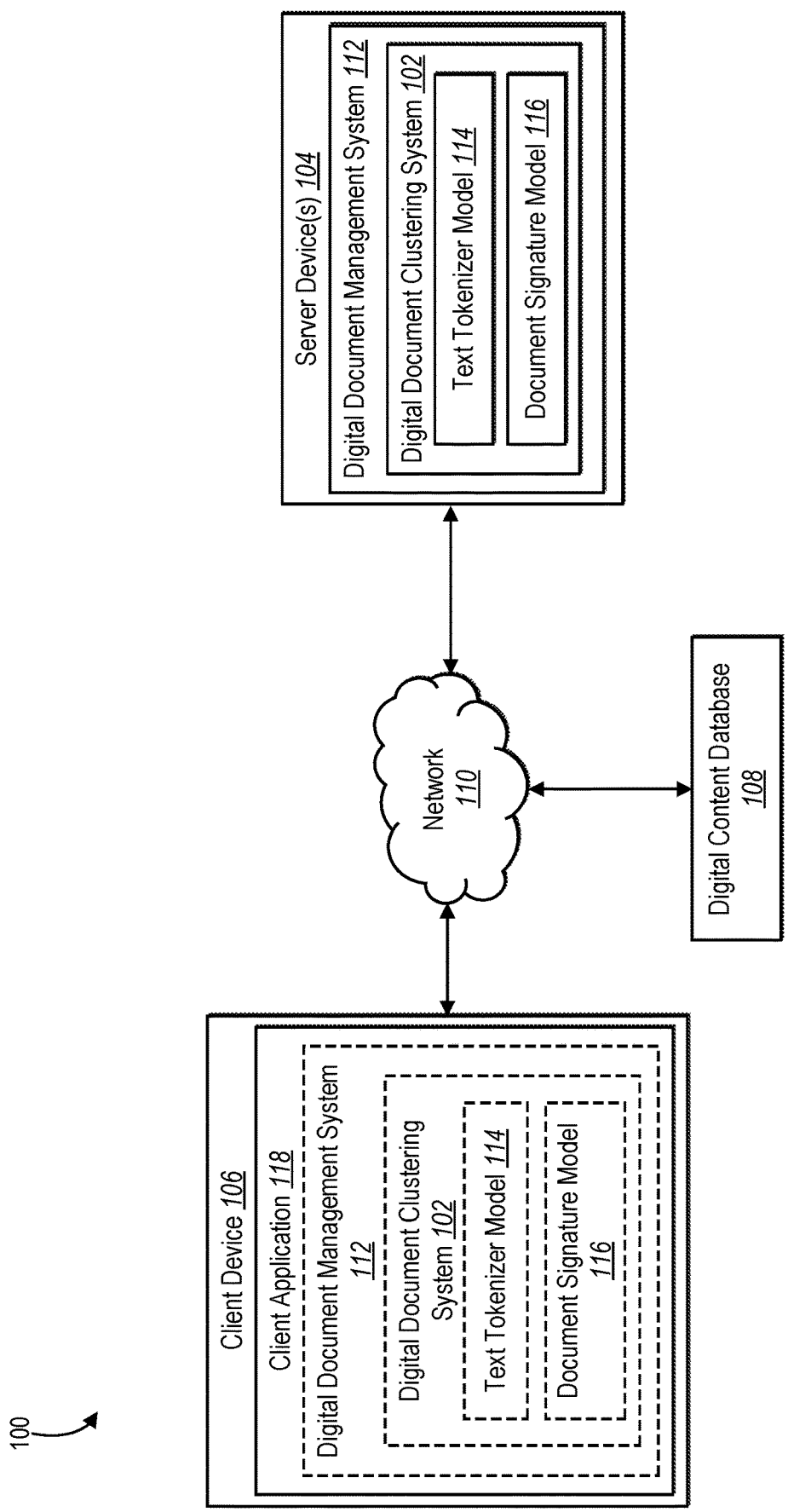
FIG. 1 illustrates an example of a system environment in which a digital document clustering system can operate in accordance with one or more implementations.

This disclosure describes one or more embodiments of a digital document clustering system that utilizes document signatures of digital documents to determine clusters of similar digital documents. In one or more embodiments, the digital document clustering system generates tokens for character strings in a digital document based on character values and string lengths of the character strings. The digital document clustering system generates a document signature for the digital document by selecting a subset of tokens based on frequency of occurrence and combining the selected subset of tokens into a token sequence. Additionally, the digital document clustering system determines a cluster of similar digital documents including the digital document based on a similarity of the document signature to the document signatures of the other document signatures. The digital document clustering system can use the cluster of similar digital documents to perform additional operations associated with the digital documents such as identifying specific data, redacting data, identifying duplicate documents, or deduplicating digital documents with significantly lower computational resources compared to conventional systems.

As mentioned, in one or more embodiments, the digital document clustering system generates tokens for character strings in a digital document. In particular, the digital document clustering system determines character values and string lengths of the character strings (e.g., words) in the digital document. The digital document clustering system generates the tokens by combining character values and string lengths of the corresponding character strings. In some embodiments, the digital document clustering system lemmatizes and cleans the digital document to remove certain character strings prior to tokenizing the digital document.

In one or more embodiments, the digital document clustering system utilizes tokens in a digital document to generate a document signature. Specifically, the digital document clustering system sorts the tokens based on frequency of occurrence of the corresponding character strings in the digital document. The digital document clustering system also determines one or more subsets of tokens based on the frequency of occurrence to generate the document signature. For instance, the digital document clustering system combines a most occurring subset of tokens and a least occurring subset of tokens into a token sequence to generate the document signature.

According to one or more embodiments, the digital document clustering system determines clusters of similar digital documents based on document signatures of digital documents. For example, the digital document clustering system generates a hash table based on the document signatures and a linked list of digital documents using the hash table. The digital document clustering system utilizes the hash table (and linked list) to separate the digital documents into clusters of similar documents based on the document signatures within the hash table.

In additional embodiments, the digital document clustering system utilizes clusters of similar digital documents to perform additional operations for digital documents. To illustrate, the digital document clustering system generates similarity scores for pairs of document signatures in a cluster of similar digital documents to determine a similarity level for each pair of digital documents. Additionally, the digital document clustering system uses the similarity scores to perform additional operations such as synchronous document similarity operations to identify duplicate documents, document deduplication, data identification, and/or data redaction.

As mentioned, conventional systems have a number of shortcomings in relation to processing digital documents. Specifically, some conventional systems utilize digital content comparison methods such as cosine similarity functions that perform direct comparisons between documents. While these conventional systems provide indications of how similar two documents are, performing such comparisons for large repositories of documents is a computationally expensive process. For example, for a repository including 100,000 documents, the conventional systems using direct comparisons of pairs of documents can result in nearly five billion combinations.

In addition to being inefficient, conventional systems that use direct comparisons (e.g., using cosine similarity algorithms) are also rigidly applicable in processing digital documents. In particular, while such conventional systems can provide accurate comparisons of content in digital documents, the conventional systems typically require synchronous access to documents to perform the comparisons. Accordingly, the conventional systems may be unable to compare documents in an asynchronous manner (e.g., without having simultaneous access to the documents).

Some conventional systems attempt to provide asynchronous comparisons of documents by using hash functions to identify duplicate files. Specifically, these conventional systems generate hash values representing the content of the documents and compare hash values of different documents. While such systems are able to identify exactly matching files using the hash functions, the conventional systems are unable to identify similar files that are not an exact match using hash functions. Indeed, the conventional systems generate two completely different hash values for two documents having the exact same content and different spacing (e.g., between any two words). Accordingly, the conventional systems are unable to determine that such documents have the same content by comparing the resulting hash values. Additionally, conventional systems that use hash functions to compare documents are unable to compare documents of different file formats due to hash functions taking metadata into consideration when calculating hash values. Thus, while conventional systems can potentially provide faster document comparisons using hash functions, they lack accuracy and flexibility and have very limited use due to the above practical limitations.

The disclosed digital document clustering system provides a number of advantages over conventional systems. For example, the digital document clustering system provides improved efficiency for computing systems that perform document analysis. In particular, in contrast to conventional systems that utilize computationally expensive direct document comparison processes such as cosine similarity, the digital document clustering system utilizes document signatures based on subsets of character string tokens to quickly compare digital documents. Specifically, by comparing two document signature including tokens representing limited subsets of content of digital documents, the digital document clustering system provides improved computing efficiency over cosine similarity operations of conventional systems, which include comprehensive comparisons of all content of all digital documents in a corpus. To illustrate, the digital document clustering system utilizes document signatures to generate a hash table (or similar data structure) with a linked list for quickly determining clusters of the same or similar digital documents. Furthermore, by using a hash table with a linked list for clustered documents, the digital document clustering system leverages the efficiency benefits of hashing while also providing accurate grouping of documents with similar/same content.

Additionally, the digital document clustering system provides improved flexibility over conventional systems. Specifically, in contrast to conventional systems that are limited to synchronous comparisons of digital documents that may require simultaneous access to digital documents, the digital document clustering system can asynchronously compare digital documents via the use of unique document signatures. For instance, by generating document signatures based on frequency of occurrence of character strings in a digital document to use in comparing digital documents, the digital document clustering system can sort the digital documents into clusters based on similarities between the document signatures. The digital document clustering system can use an index of the clusters to asynchronously determine a similarity between different documents without requiring simultaneous access to the documents.

Furthermore, in contrast to conventional systems that use hash functions to find identical documents (e.g., via hash functions), the digital document clustering system can quickly identify the same or similar documents. In particular, by generating document signatures that combine tokens of character strings based on frequency of occurrence, the digital document clustering system can determine clusters of digital documents that are the same or similar. The digital document clustering system can thus accurately determine whether two documents are similar even if the documents include slight variations without requiring direct comparisons of all content in the documents. Accordingly, the digital document clustering system improves the flexibility and efficiency over conventional systems by providing fast and accurate comparisons of text content in digital documents without requiring synchronous access to the digital documents.

Turning now to the figures, FIG. 1 includes an embodiment of a system environment 100 in which an digital document clustering system 102 is implemented. In particular, the system environment 100 includes server device(s) 104, a client device 106, and a digital content database 108 in communication via a network 110. Moreover, as shown, the server device(s) 104 include an digital document management system 112, which includes the digital document clustering system 102. As further illustrate in FIG. 1, the digital document management system includes a text tokenizer model 114 and a document signature model 116. Furthermore, the client device 106 includes a client application 118.

As shown in FIG. 1, in one or more implementations, the server device(s) 104 include or host the digital document management system 112. Specifically, the digital document management system 112 includes, or is part of, one or more systems that process digital documents from the digital content database 108. For example, the digital document management system 112 provides tools to the client device 106 for sending a request to the digital document management system 112 to process the digital documents in the digital content database 108. In one or more embodiments, the digital document management system 112 provides tools to the client device 106 via the client application 118 for analyzing content of the digital documents (e.g., by comparing digital documents in the digital content database 108) and/or by performing additional operations.

According to some embodiments, the digital document management system 112 receives a request from the client device 106 to perform various operations associated with digital documents (e.g., from the digital content database 108). For instance, the client device 106 can send a request to identify specific information in the digital documents, redact information from the digital documents, identify duplicate documents, or deduplicate the digital documents (e.g., by removing copies of documents from the digital content database). To illustrate, the client device 106 includes the client application 118 (e.g., a proprietary application or a web browser) to communicate with the digital document management system 112 via the network 110 to view digital documents from the digital content database 108 and issue the request to the digital document management system 112.

Although FIG. 1 illustrates a single digital content database, in one or more embodiments, the digital document management system 112 processes digital documents from a plurality of digital content databases. For instance, the client device 106 can send a request to the digital document management system 112 to process digital documents from more than one separate source. The digital document management system 112 can process the digital documents from each source for performing operations on the digital documents, including, but not limited to, identifying information (e.g., personally identifiable information) in digital documents in all sources, redacting information from the digital documents in all sources, or deduplicating digital documents across all sources. To illustrate, the digital document management system 112 compares a local storage (e.g., on the client device 106) to a cloud storage database to remove duplicates of digital documents across the local storage and the cloud storage database.

As used herein, the term "digital document" refers to a computer representation of a document including text. For example, a digital document includes a form of information including data associated with one or more topics. To illustrate, a digital document includes a computer representation of a medical form (e.g., with patient or provider information), an academic or informational paper, a book (or a portion of a book), or other paper or file that includes text corresponding to a given topic. Accordingly, the digital content database 108 can include a plurality of digital documents corresponding to one or more entities and/or one or more topics.

In one or more embodiments, the digital document management system 112 utilizes the digital document clustering system 102 to compare digital documents. For instance, the digital document clustering system 102 utilizes the text tokenizer model 114 to tokenize character strings in digital documents. As used herein, the term "characters string" refers to one or more characters corresponding to a separate sequence. For example, a character string includes a word in a particular language separated from other words in text in a digital document by a space or punctuation. In other embodiments, a character string includes one or more character values in a numerical sequence or combination of alphabetical and numerical characters. The digital document clustering system 102 also utilizes the document signature model 116 to generate document signatures for the digital documents. Additionally, the digital document clustering system uses the document signatures to determine clusters of similar digital documents.

In some embodiments, the digital document clustering system 102 (or the digital document management system 112) leverages the clusters of similar digital documents to perform additional operations based on identifying similar or identical documents, as described above. In some embodiments, the digital document clustering system 102 and/or the digital document management system 112 provide the results of operations performed on the digital documents to the client device 106 (e.g., provides indications of clusters of similar digital documents for display via the client application 118). In additional embodiments, the digital document clustering system 102 and/or the digital document management system 112 alters the digital documents or generates data associated with the digital documents for storage at the digital content database 108.

In one or more embodiments, the server device(s) 104 include a variety of computing devices, including those described below with reference to FIG. 13. For example, the server device(s) 104 includes one or more servers for storing and processing data associated with digital document processing and analysis. In some embodiments, the server device(s) 104 also include a plurality of computing devices in communication with each other, such as in a distributed storage environment. In some embodiments, the server device(s) 104 include a content server. The server device(s)

104 also optionally includes an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 13. Furthermore, although not shown in FIG. 1, the client device 106 can be operated by a user (e.g., a user included in, or associated with, the system environment 100) to perform a variety of functions. In particular, the client device 106 performs functions such as, but not limited to, accessing, viewing, and interacting with digital documents (e.g., text in digital documents). In some embodiments, the client device 106 also performs functions for generating, capturing, or accessing data to provide to the digital document management system 112 and the digital document clustering system 102 in connection with digital documents. For example, the client device 106 communicates with the server device(s) 104 via the network 110 to provide information (e.g., user interactions) associated with digital documents. Although FIG. 1 illustrates the system environment 100 with a single client device, in some embodiments, the system environment 100 includes a different number of client devices. In some embodiments, the client device 106 or the server device(s) 104 also host the digital content database 108.

Additionally, as shown in FIG. 1, the system environment 100 includes the network 110. The network 110 enables communication between components of the system environment 100. In one or more embodiments, the network 110 may include the Internet or World Wide Web. Additionally, the network 110 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104, the client device 106, and the digital content database 108 communicate via the network using one or more communication platforms and technologies suitable for transporting data and/or communication signals, including any known communication technologies, devices, media, and protocols supportive of data communications, examples of which are described with reference to FIG. 13.

Although FIG. 1 illustrates the server device(s) 104, the client device 106, and the digital content database 108 communicating via the network 110, in alternative embodiments, the various components of the system environment 100 communicate and/or interact via other methods (e.g., the server device(s) 104, the client device 106, and the digital content database 108 can communicate directly). Furthermore, although FIG. 1 illustrates the digital document clustering system 102 and the digital document management system 112 being implemented by a particular component and/or device within the system environment 100, the digital document clustering system 102 and/or the digital document management system 112 can be implemented, in whole or in part, by other computing devices and/or components in the system environment 100 (e.g., the client device 106 or a system associated with the digital document management system 112).

In particular, in some implementations, the digital document clustering system 102 (or the digital document management system 112) on the server device(s) 104 supports the digital document clustering system 102 (or the digital document management system 112) on the client device 106. For instance, the digital document clustering system 102 on the server device(s) 104 generates or trains the digital document clustering system 102 (e.g., the text tokenizer model 114 and the document signature model 116) for the client device 106. The server device(s) 104 provides the generated/trained digital document clustering system 102 to the client device 106. In other words, the client device 106 obtains (e.g., downloads) the digital document clustering system 102 from the server device(s) 104. At this point, the client device 106 is able to utilize the digital document clustering system 102 to generate document signatures and determine clusters of similar documents based on the document signatures independently from the server device(s) 104.

In alternative embodiments, the digital document clustering system 102 includes a web hosting application that allows the client device 106 to interact with content and services hosted on the server device(s) 104. To illustrate, in one or more implementations, the client device 106 accesses a web page supported by the server device(s) 104. The client device 106 provides input to the server device(s) 104 to perform digital document editing or data retrieval operations, and, in response, the digital document clustering system 102 or the digital document management system 112 on the server device(s) 104 performs operations to edit digital documents or retrieve data. The server device(s) 104 provide the output or results of the operations to the client device 106.

Figure 2:
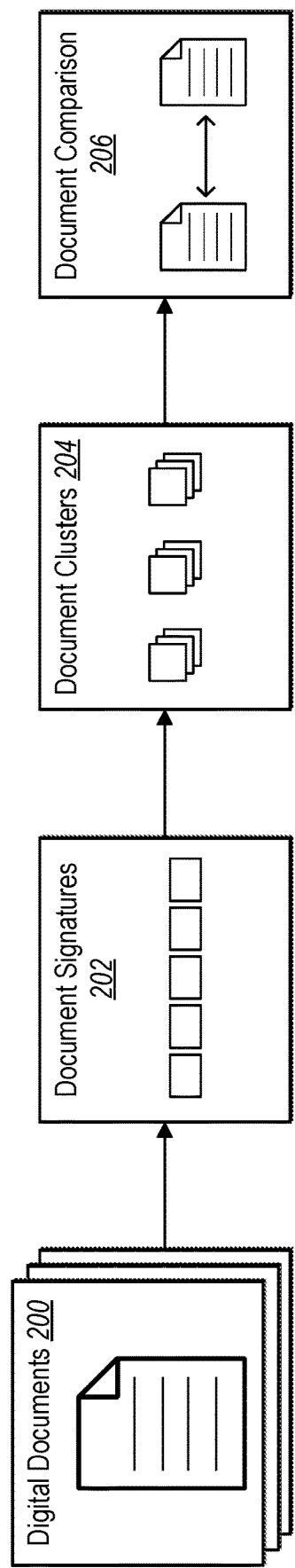
FIG. 2 illustrates an example of an overview of the digital document clustering system clustering digital documents based on document signatures in accordance with one or more implementations.

As mentioned, the digital document clustering system 102 utilizes document signatures to sort digital documents into a cluster of similar documents. FIG. 2 illustrates an example of the digital document clustering system 102 clustering similar digital documents based on document signatures. Additionally, FIG. 2 illustrates that the digital document clustering system 102 performs an additional operation of a directly comparing digital documents based on the clusters of similar digital documents.

In one or more embodiments, as illustrated in FIG. 2, the digital document clustering system 102 identifies a plurality of digital documents 200 from one or more document sources. In particular, the digital document clustering system 102 accesses the digital documents 200 from a database including many digital documents (e.g., tens of thousands or hundreds of thousands of digital documents). Additionally, the digital documents 200 include text that corresponds to one or more topics and includes instructions, description, questionnaire questions/responses. Furthermore, the text in the digital documents 200 includes structured or unstructured data, such as text in paragraphs, sentences, words, phrases, bulleted lists, text fields, freeform responses, or other text data structures.

Figure 3:
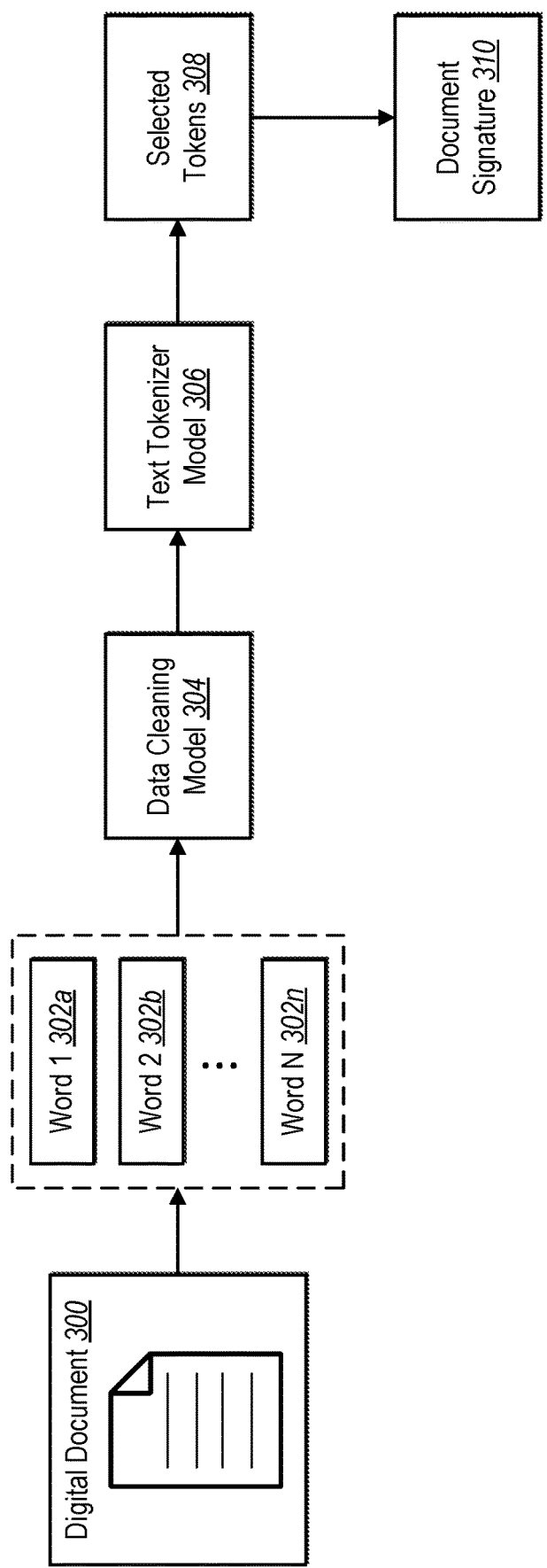
FIG. 3 illustrates an example of the digital document clustering system generating a document signature for a digital document based on digital text in the digital document in accordance with one or more implementations.
Figure 5A:
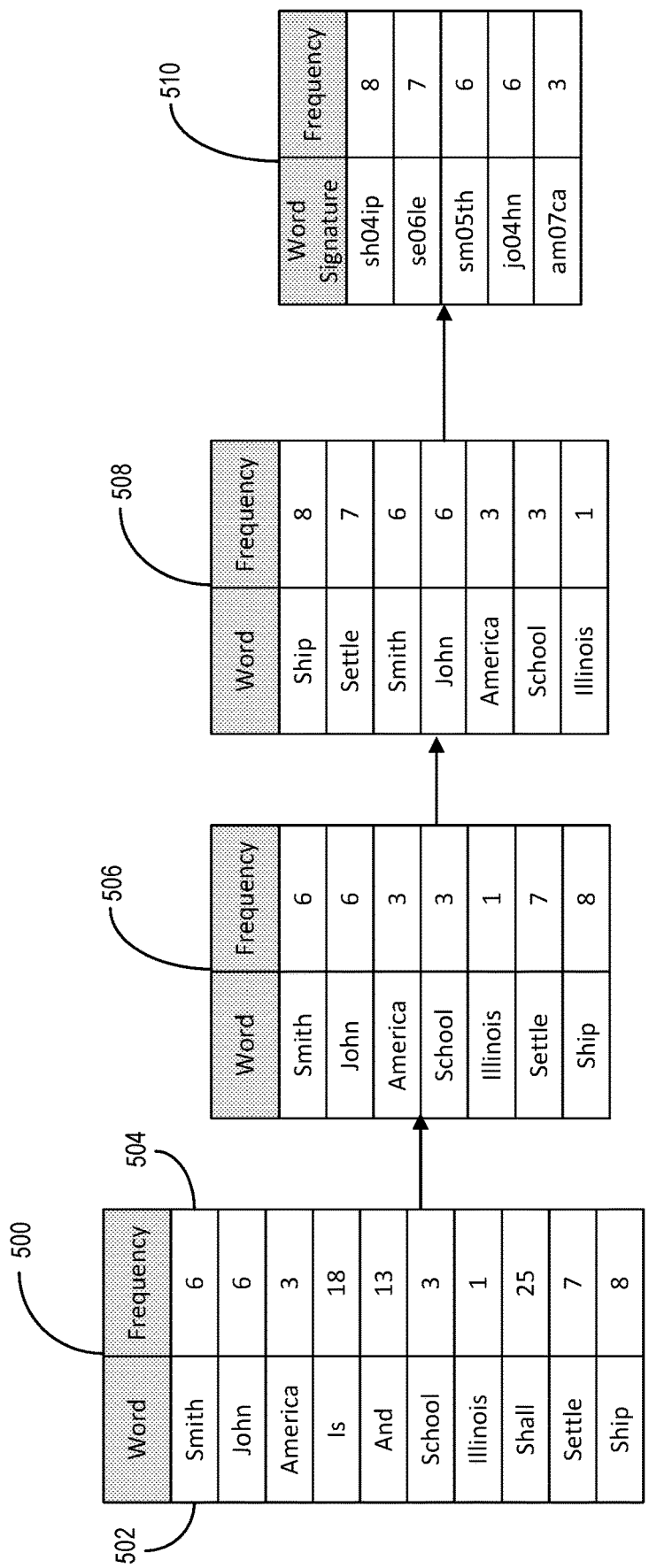
FIGS. 5A-5B illustrate an example of the overview of the digital document clustering system tokenizing character strings in a digital document and generating a document signature based on the tokenized character strings in accordance with one or more implementations.
Figure 5B:
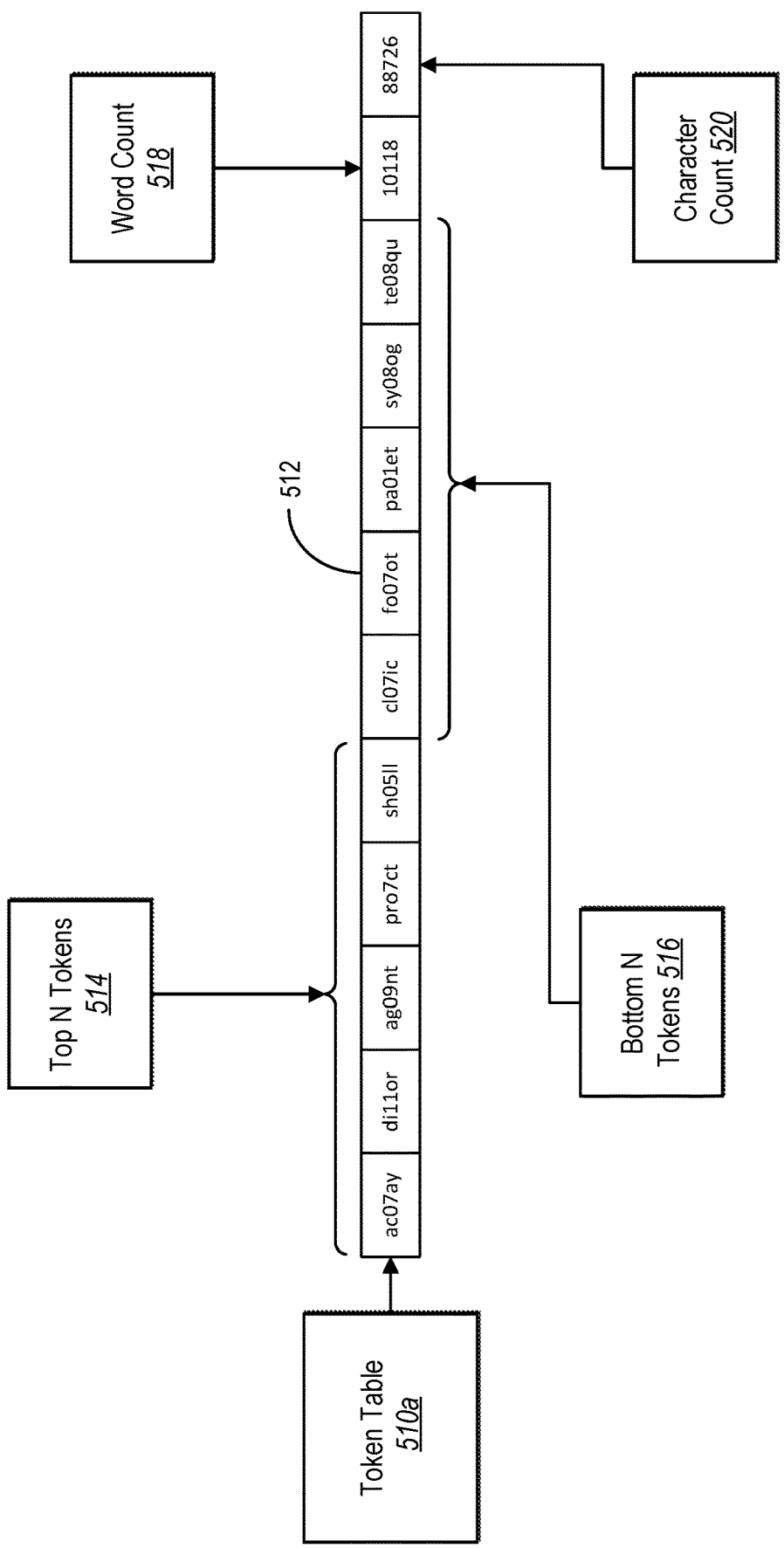

According to one or more embodiments, as illustrated in FIG. 2, the digital document clustering system 102 generates document signatures 202 based on the digital documents 200. For instance, the digital document clustering system 102 generates the document signatures 202 to represent the content of the digital documents 200. To illustrate, the digital document clustering system 102 generates the document signatures 202 based on the text in the digital documents to provide a unique identifier for each of the digital documents 200. FIGS. 3 and 5A-5B and the corresponding description provide additional detail with respect to the digital document clustering system 102 generating document signatures for digital documents.

FIG. 2 also illustrates that the digital document clustering system 102 determines document clusters 204 of similar digital documents based on the document signatures 202. Specifically, the digital document clustering system 102 compares the document signatures 202 to identify similar digital documents based on a similarity of corresponding document signatures. Additionally, the digital document clustering system 102 can cluster the similar digital documents within a data structure (e.g., a hash table or list) based on the similarity of the corresponding document signatures. FIGS. 4 and 6-10 provide additional detail with respect to the digital document clustering system 102 comparing document signatures and clustering digital documents based on the similarity of document signatures.

In one or more embodiments, the digital document clustering system 102 also performs additional operations on digital documents based on clusters of similar digital documents. For example, as illustrated in FIG. 2, the digital document clustering system 102 utilizes the document clusters 204 to perform a document comparison 206 between pairs of digital documents. In particular, the digital document clustering system 102 identifies similar digital documents (e.g., documents within a given cluster) and utilizes a direct comparison process (e.g., a cosine similarity model) to directly compare the content of two or more digital documents to determine a final similarity level of the digital documents. In additional embodiments, the digital document clustering system 102 performs operations associated with identifying and storing specific information or identifying and removing/redacting specific information from digital documents in a cluster of similar digital documents.

FIG. 3 illustrates an example of the digital document clustering system 102 generating a document signature from a digital document. Specifically, FIG. 3 illustrates that the digital document clustering system 102 determines content of a digital document 300 using digital text processes. Additionally, FIG. 3 illustrates that the digital document clustering system 102 cleans the content of the digital document 300 to remove specific terms or character strings from the content of the digital document 300. FIG. 3 also illustrates that the digital document clustering system 102 tokenizes the remaining content of the digital document 300 and generates the unique identifier for the digital document 300 based on the generated tokens.

In one or more embodiments, as mentioned, the digital document clustering system 102 determines content of the digital document 300. In particular, the digital document clustering system 102 utilizes digital text processing including a text extraction model to extract content from the digital document 300. For instance, the digital document clustering system 102 extracts a plurality of words 302a-302n (i.e., character strings) from the digital document 300. To illustrate, the digital document clustering system 102 utilizes a text extraction model to separate the digital document 300 into the plurality of words 302a-302n by recognizing character strings based on spaces or punctuation in the text, dictionary words identified in the text, or other identifiable character strings in the text.

According to one or more embodiments, in response to extracting the words 302a-302n from the digital document 300, the digital document clustering system 102 cleans the extracted content from the digital document 300. Specifically, the digital document clustering system 102 utilizes a data cleaning model 304 to clean the text extracted from the digital document 300. For example, the digital document clustering system 102 utilizes the data cleaning model 304 to remove certain words from the words 302a-302n. To illustrate, the digital document clustering system 102 removes stop words, such as "is," "and," "or," etc., that are common parts of speech and are typically filtered out of text prior to processing text.

In addition to removing stop words, the digital document clustering system 102 also utilizes the data cleaning model 304 to lemmatize the words 302a-302n. In some embodiments, the digital document clustering system 102 utilizes the data cleaning model 304 to identify groups of words according to inflected or variant forms of the same words. In particular, the digital document clustering system 102 groups words in the digital document 300 to analyze a group of words as a single item. To illustrate, the digital document clustering system 102 lemmatizes the words 302a-302n after removing the stop words to process root words (e.g., "settled" and "settling" lemmatized to "settle").

As illustrated in FIG. 3, in one or more embodiments, the digital document clustering system 102 also tokenizes the text of the digital document 300 in response to cleaning the text. For example, the digital document clustering system 102 utilizes a text tokenizer model 306 to generate tokens from the cleaned words from the digital document 300. Specifically, the digital document clustering system 102 utilizes the text tokenizer model 306 to generate tokens based on attributes of the words (e.g., character values and string lengths). Additionally, the digital document clustering system 102 also tracks a number of instances of each word to store with the generated tokens.

Furthermore, in one or more embodiments, the digital document clustering system 102 determines selected tokens 308 from the generated tokens. In particular, in response to generating tokens for a set of words in the digital document 300, the digital document clustering system 102 selects one or more subsets of the tokens. More specifically, the digital document clustering system 102 selects one or more subsets based on the frequency of occurrence of the corresponding words in the digital document 300. To illustrate, the digital document clustering system 102 selects a number of tokens based on the frequency of the corresponding words in the digital document 300 (e.g., the tokens corresponding to the words with the top frequency in the digital document 300). Additionally, the digital document clustering system 102 selects a second subset of tokens corresponding to the least frequent words in the digital document 300.

As illustrated in FIG. 3, in response to determining the selected tokens 308, the digital document clustering system 102 generates a document signature 310 representing the digital document 300. Specifically, the digital document clustering system 102 generates the document signature 310 from the selected tokens 308 by combining the selected tokens 308. For instance, the digital document clustering system 102 concatenates token values from the selected tokens 308 to generate a document signature 310 that represents the content of the digital document 300.

Figure 4:
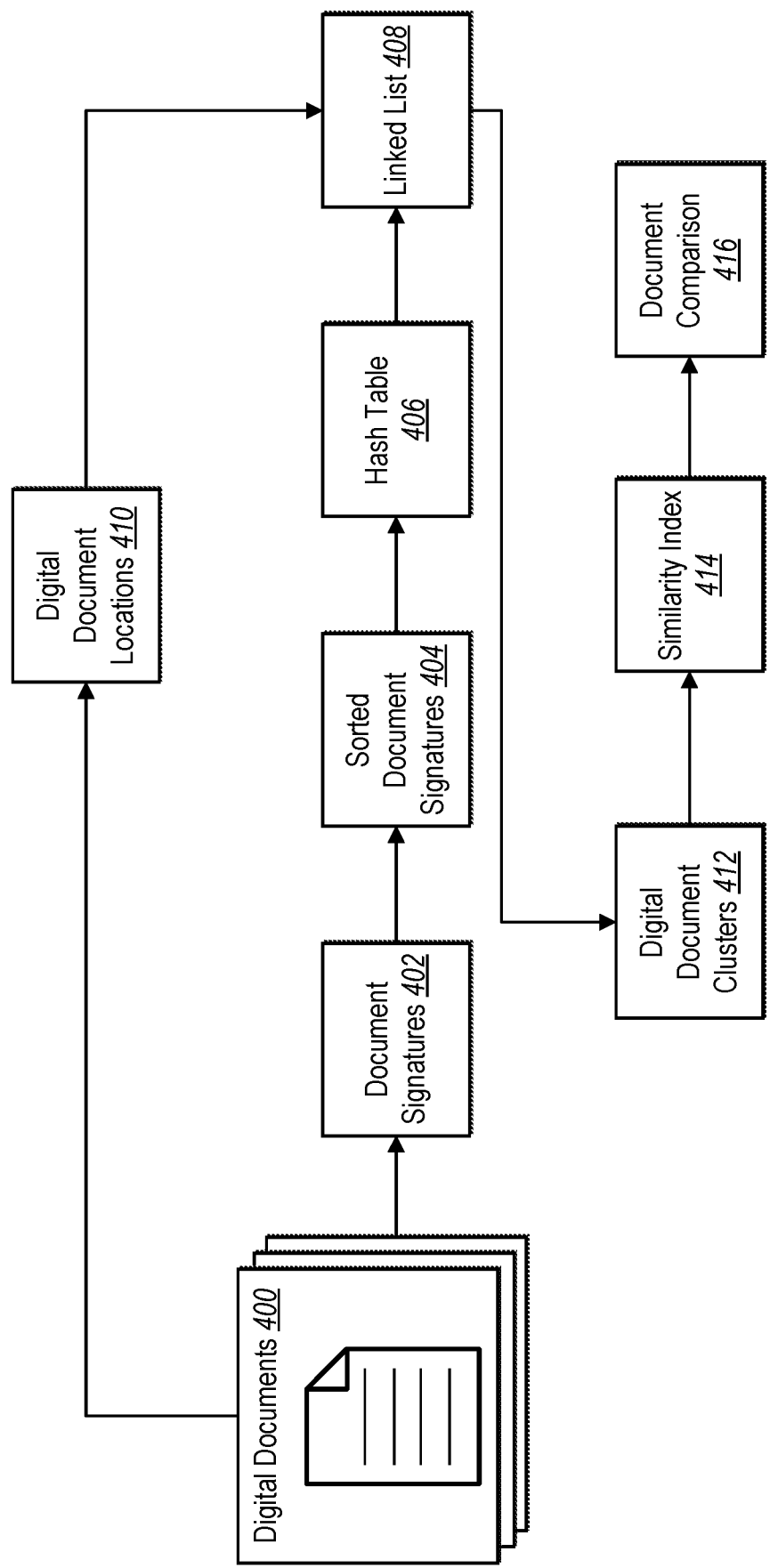
FIG. 4 illustrates an example of the digital document clustering system determining a cluster of digital documents utilizing a hash table of document signatures in accordance with one or more implementations.

FIG. 4 illustrates that the digital document clustering system 102 utilizes document signatures to determine clusters of similar digital documents. In particular, as illustrated in FIG. 4, the digital document clustering system 102 separates digital documents 400 by comparing document signatures. Additionally, the digital document clustering system 102 utilizes document signatures representing the digital documents 400 to determine similar digital documents. The digital document clustering system 102 also performs additional operations (e.g., document comparisons) on the digital documents based on the clusters.

In one or more embodiments, as illustrated in FIG. 4, the digital document clustering system 102 generates document signatures 402 for the digital documents 400. For instance, as previously described above with respect to FIG. 3, the digital document clustering system 102 generates the document signatures 402 based on the content (e.g., text) in the digital documents 400. More specifically, the digital document clustering system 102 generates the document signatures 402 based on one or more subsets of tokens generated from the content in the digital documents 400. In some embodiments, the digital document clustering system 102 also adds a word count indicating a total number of character strings (or cleaned character strings) to a digital signature of a digital document. Accordingly, each document signature represents one or more subsets of text of the digital documents.

According to one or more embodiments, the digital document clustering system 102 determines sorted document signatures 404 for the digital documents 400. To illustrate, the digital document clustering system 102 sorts the document signatures by token frequency and/or alphabetical order. For example, the digital document clustering system 102 determines the sorted document signatures 404 based on the most frequent character strings in the digital documents 400. In some embodiments, the digital document clustering system 102 determines the sorted document signatures 404 by sorting token values from the digital documents 400 according to frequency/alphabetical order prior to generating the document signatures 402. Alternatively, the digital document clustering system 102 sorts token values in the document signatures 402 according to frequency/alphabetical order in the process of, or after, generating the document signatures 402.

In at least some embodiments, as illustrated in FIG. 4, the digital document clustering system 102 generates a hash table 406 from the sorted document signatures 404. Specifically, the digital document clustering system 102 generates a plurality of hash values for each of the sorted document signatures 404. For instance, the digital document clustering system 102 utilizes at least a portion of a document signature to generate a hash value. Accordingly, the digital document clustering system 102 can generate the hash table 406 by inserting a plurality of hash values generated from the sorted document signatures 404 into the hash table 406. The hash table 406 includes a key-value pair in which the key is the hash value and the value is the corresponding document signature. In alternative embodiments, the digital document clustering system 102 generates a different data structure (e.g., a list) based on the sorted document signatures.

According to one or more embodiments, the digital document clustering system 102 also generates a linked list 408 based on the hash table 406. In particular, the digital document clustering system 102 utilizes digital document locations 410 of the digital documents 400 in connection with the hash table 406 to generate the linked list 408. For example, the digital document clustering system 102 links the digital document locations 410 to the digital documents 400 based on corresponding hash values in the hash table 406. Thus, the digital document clustering system 102 can provide the linked list 408 for later accessing the digital documents 400 for performing additional operations in connection with identifying similar digital documents.

Additionally, as illustrated in FIG. 4, the digital document clustering system 102 determines digital document clusters 412 including groups of similar digital documents. Specifically, the digital document clustering system 102 utilizes the hash table 406 and/or the linked list 408 to group the digital documents 400 into clusters of similar digital documents. In one or more embodiments, the digital document clustering system 102 identifies similar digital documents using the sorted document signatures 404. The digital document clustering system 102 can also access the similar digital documents using the hash table 406 and the linked list 408.

In some embodiments, as illustrated in FIG. 4, the digital document clustering system 102 utilizes the digital document clusters 412 to perform specific operations on the digital documents 400. For example, the digital document clustering system 102 can further process the digital documents 400 to further refine determinations of similarity of groups of digital documents. To illustrate, the digital document clustering system 102 generates a similarity index 414 indicating individual similarities between pairs of digital documents. In particular, the digital document clustering system 102 performs a direct comparison of document signatures of digital documents having the same hash value in the hash table 406 to determine an estimated similarity of the corresponding digital documents.

According to additional embodiments, the digital document clustering system 102 utilizes the similarity index 414 to identify digital documents that have the same or similar content. As illustrated in FIG. 4, in response to identifying two digital documents as the same or similar digital documents, the digital document clustering system 102 can determine a specific similarity level for the pair of digital documents. More specifically, the digital document clustering system 102 determines a document comparison 416 for the pair of digital documents, such as by utilizing cosine similarity or other document comparison process (e.g., Euclidean distance, term frequency-inverse document frequency models, or long short-term memory neural networks). In addition, the digital document clustering system 102 can use the document comparison 416 to identify specific information in a subset of digital documents (e.g., a few documents in a large document corpus), redact or modify specific information in a subset of digital documents, or deduplication a subset of digital documents.

As mentioned, FIGS. 5A-5B illustrate an example of the digital document clustering system 102 generating document signatures based on content in a digital document. In one or more embodiments, as illustrated in FIG. 5A, the digital document clustering system 102 extracts a word table 500 including a plurality of character strings (e.g., words) in a digital document. To illustrate, the digital document clustering system 102 can parse content of the digital document to extract a plurality of different words in the digital document. Additionally, as shown, the digital document clustering system 102 determines a frequency of occurrence of each word (e.g., a number of instances of each word) in the digital document. For instance, the digital document clustering system 102 determines that a first word 502 (e.g., "Smith") has a first frequency 504 (e.g., six instances) in the digital document.

In one or more embodiments, as mentioned, the digital document clustering system 102 utilizes a data cleaning model to clean the word table 500. Specifically, as illustrated in FIG. 5A, the digital document clustering system 102 determines a cleaned word table 506 based on the word table 500. For example, the digital document clustering system 102 determines one or more words in the word table 500 that are commonly used in a detected language associated with the digital document. To illustrate, the digital document clustering system 102 identifies words that provide little to no descriptive information about the digital document, including, but not limited to, articles, conjunctions, and state of being verbs (e.g., "is," "are," "shall"). In additional embodiments, the digital document clustering system 102 removes words having fewer than a threshold number of characters (e.g., words with one, two, or three characters).

Furthermore, in one or more embodiments, the digital document clustering system 102 utilizes the data cleaning model (or another data cleaning model) to lemmatize the word table 500. For instance, the digital document clustering system 102 groups words corresponding to similar root/base words. To illustrate, the digital document clustering system 102 identifies a plurality of instances of character strings in the word table 500 that correspond to the root word "settle"—such as "settles," "settled," or "settling." The digital document clustering system 102 can also combine the corresponding frequency counts of lemmatized word groups within the cleaned word table 506. To illustrate, the digital document clustering system 102 can sum the frequency values for "settle," "settles," "settled," and "settling" from the word table 500 into a single frequency value in the cleaned word table 506.

According to one or more embodiments, in response to cleaning the word table 500 (e.g., by removing stop words and lemmatizing the words in the word table), the digital document clustering system 102 sorts the cleaned word table 506. Specifically, the digital document clustering system 102 sorts the remaining words in the cleaned word table 506 according to frequency. For example, the digital document clustering system 102 sorts the words from the cleaned word table 506 from highest to lowest frequency (e.g., with words having the highest number of instances in the word document to the lowest number of instances in the word document). In some embodiments, the digital document clustering system 102 further sorts the words according to alphabetical order such that words with the same number of instances are sorted alphabetically (e.g., words having the same number of instances are sorted according to ascending or descending alphabetical order). Accordingly, the digital document clustering system 102 can generate a sorted word table 508 based on the selected sorting methods.

In at least some embodiments, the digital document clustering system 102 tokenizes words from the digital document. In particular, the digital document clustering system 102 generates a plurality of tokens for the words in the sorted word table 508 based on a plurality of attributes of the words. For instance, the digital document clustering system 102 determines character values corresponding to one or more characters in the word. Additionally, the digital document clustering system 102 determines a string length indicating a number of characters in the word.

The digital document clustering system 102 can generate a token for the word by combining a subset of character values from the word with the string length. To illustrate, the digital document clustering system 102 selects a first subset of character values from a beginning portion of the word and a second subset of character values from an ending portion of the word. More specifically, in one or more embodiments, the digital document clustering system 102 determines the first two character values from the word, the last two character values from the word, and the string length. The digital document clustering system 102 can generate the token by concatenating the first two character values, the string length (e.g., two digits), and the last two character values in a sequence. Accordingly, the resulting token for the word is a six-character word including a combination of character values from the extracted word and the string length.

As an example, the digital document clustering system 102 generates a token for the word "settle" by determining the first two characters "se," the last two characters "le," and the string length to two digits "06." Accordingly, the digital document clustering system 102 concatenates the determined character values to generate a token of "se06le," as shown in FIG. 5A. FIG. 5A also illustrates a token table 510 including a plurality of additional tokens generated from a plurality of words in a digital document. In alternative embodiments, the digital document clustering system 102 selects different subsets of character values (e.g., more or fewer character values, different portions of a word) and/or combines the determined character values and/or string length in a different order (e.g., the first two characters, the last two characters, and the string length).

In response to generating the token table 510 including tokens for a set of words in a digital document, the digital document clustering system 102 generates a document signature for the digital document. Specifically, as illustrated in FIG. 5B, the digital document clustering system 102 utilizes a token table 510a to generate a document signature 512 including a plurality of token values from the token table 510a. For example, the digital document clustering system 102 selects a subset of tokens from the token table 510a and generates the document signatures 512 by combining the subset of tokens. To illustrate, the digital document clustering system 102 concatenates the subset of tokens into a token sequence. Accordingly, the digital document clustering system 102 inserts contextual information about the content of the digital document into the document signature 512.

According to one or more embodiments, the digital document clustering system 102 determines a first subset of tokens corresponding to a first subset of character strings based on the token table 510a. In particular, the digital document clustering system 102 determines the top N tokens 514 from the token table 510a for generating the document signature 512. To illustrate, the top N tokens 514 include tokens representing character strings with the highest frequency of occurrence in the digital document. For example, the digital document clustering system 102 determines the top five tokens based on frequency of occurrence of corresponding character strings in the digital document. In another example, the digital document clustering system 102 determines N tokens having frequencies of occurrence above a frequency threshold (e.g., more than 3 occurrences of a lemmatized word).

Furthermore, the digital document clustering system 102 determines a second subset of tokens corresponding to a second subset of character strings based on the token table 510a. Specifically, the digital document clustering system 102 determines the bottom N tokens 516 from the token table 510a for generating the document signature 512. For instance, the bottom N tokens 516 include tokens representing character strings with the lowest frequency of occurrence in the digital document. As an example, the digital document clustering system 102 determines the bottom five tokens based on frequency of occurrence of corresponding character strings in the digital document. In another example, the digital document clustering system 102 determines N tokens having frequencies of occurrence below the frequency threshold (e.g., fewer than 3 occurrences of a lemmatized word).

In response to determining one or more subsets of tokens from the token table 510a (e.g., the top N tokens 514 and the bottom N tokens 516), the digital document clustering system 102 generates the document signature 512. In one or more embodiments, the digital document clustering system 102 concatenates the top N tokens 514 and the bottom N tokens 516 to generate the document signature 512. For example, as illustrated in FIG. 5B, the digital document clustering system 102 concatenates the top N tokens 514 together and concatenates the bottom N tokens 516 after the top N tokens 514. In alternative embodiments, the digital document clustering system 102 concatenates the tokens in a different order (e.g., the bottom N tokens 516 followed by the top N tokens 514) into a token sequence to generate the document signature 512.

In alternative embodiments, the digital document clustering system 102 determines a different number of tokens or different subsets of tokens. For instance, the digital document clustering system 102 may utilize only the top N tokens 514 to generate the document signature 512. In another example, the digital document clustering system 102 also utilizes N tokens corresponding to character strings with a median frequency of occurrence in the digital document (e.g., five tokens at or near a median occurrence value). Accordingly, the digital document clustering system 102 can select any number of tokens and/or any number of subsets of tokens based on frequency of occurrence of corresponding character strings in the digital document (e.g., based on statistical analysis of language or data that indicate rank-frequency distribution associated with data).

In one or more embodiments, the digital document clustering system 102 also appends additional information to the token sequence. For example, as illustrated in FIG. 5B, the digital document clustering system 102 can determine statistical information associated with the digital document, such as, but not limited to a word count 518 and a character count 520. In one or more embodiments, the word count 518 and character count 520 correspond to a total number words and characters in the digital document or a total number of words and characters after cleaning the digital document (e.g., with stop words removed). The digital document clustering system 102 can append the word count 518 and the character count 520 to the document signature 512 (e.g., to the end of the document signature 512). Thus, the digital document clustering system 102 can generate the document signature 512 to include the top N tokens 514, the bottom N tokens 516, the word count 518, and the character count 520. By including such information in the document signature 512, the digital document clustering system 102 provides sufficient information in the document signature 512 for comparing to other digital documents (e.g., for identifying exact duplicates of digital documents).

Figure 6:
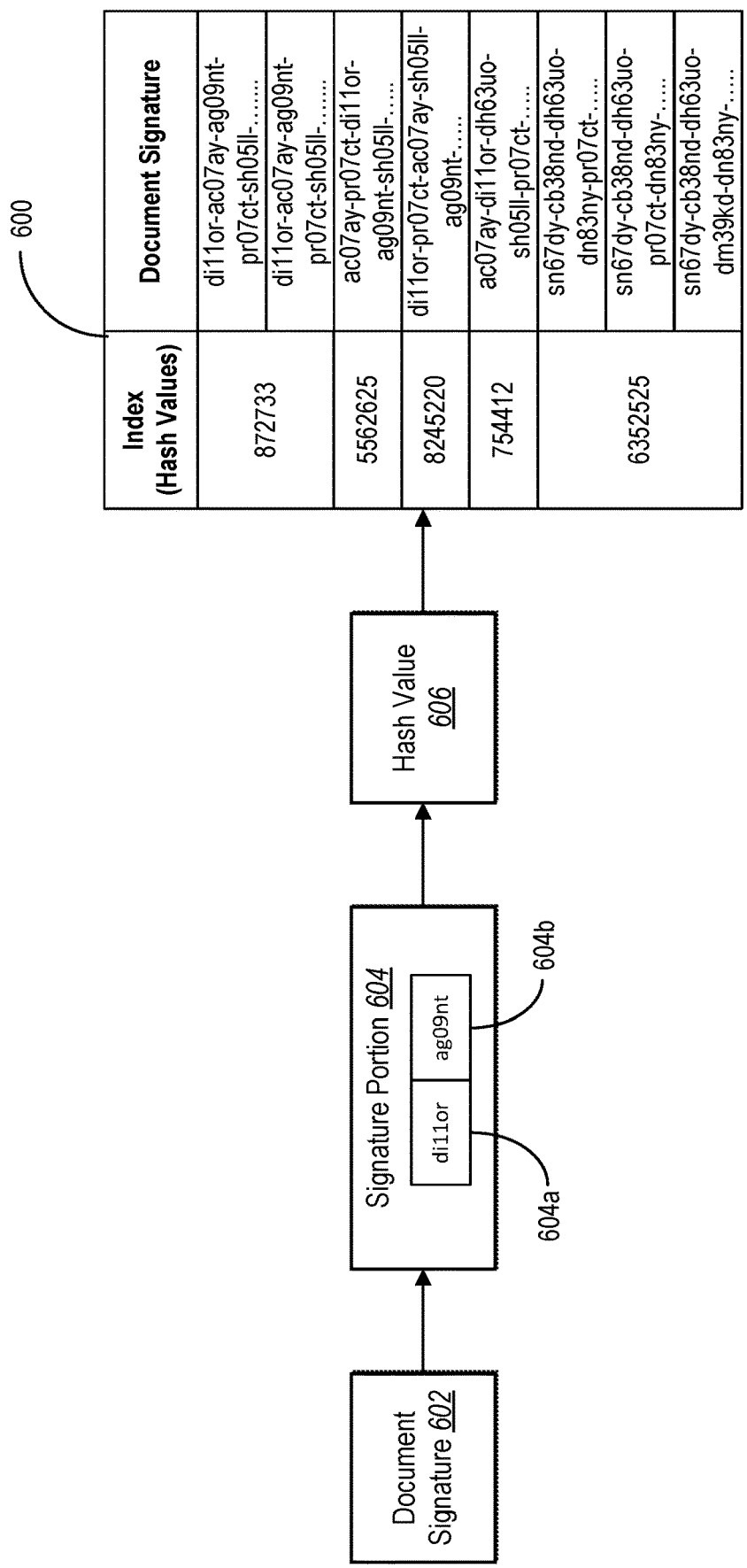
FIG. 6 illustrates an example of the digital document clustering system generating a hash table of document signatures in accordance with one or more implementations.

In connection with generating document signatures for digital documents, the digital document clustering system 102 can store the document signatures into a table or list. In particular, as illustrated in FIG. 6, the digital document clustering system 102 generates a hash table 600 including a plurality of document signatures corresponding to a plurality of digital documents. More specifically, the digital document clustering system 102 generates hash values representing the document signatures for storing in the hash table 600.

For example, FIG. 6 illustrates that the digital document clustering system 102 processes a document signature 602 corresponding to a specific digital document for storing within the hash table 600. According to one or more embodiments, the digital document clustering system 102 sorts a plurality of tokens in the document signature 602 according to frequency and alphabetical order. To illustrate, the digital document clustering system 102 sorts the tokens in the document signature 602 such that the tokens are positioned from a starting position by frequency in descending order (e.g., the highest frequency tokens being first and the lowest frequency tokens being last). In some embodiments, the digital document clustering system 102 sorts the tokens in the document signature 602 prior to generating the document signature 602. In alternative embodiments, the digital document clustering system 102 sorts the tokens in the document signature 602 after generating the document signature 602.

In some implementations, the digital document clustering system 102 determines a signature portion 604 including a subset of tokens from the document signature 602. FIG. 6 illustrates that the digital document clustering system 102 determines the signature portion 604 including a first token 604a and a second token 604b (e.g., the first two values) of the document signature 602. Although FIG. 6 illustrates specific tokens of the document signature 602 as the signature portion 604, in other embodiments, the digital document clustering system 102 determines additional or other tokens for the signature portion 604.

In response to determining the signature portion 604, the digital document clustering system 102 generates a hash value 606 from the signature portion 604. In particular, the digital document clustering system 102 utilizes a hash function to generate the hash value 606 from the first token 604a and the second token 604b. For example, the digital document clustering system 102 utilizes the hash function to generate the hash value 606 from the concatenated values of the first token 604a and the second token 604b.

The digital document clustering system 102 inserts the hash value 606 into the hash table 600 according to a key-value pair for the hash value 606. Specifically, as illustrated in FIG. 6, the digital document clustering system 102 determines the hash value 606 as a key for the key-value pair based on the document signature 602. Additionally, the digital document clustering system 102 determines the full document signature 602 as a value for the key-value pair in the hash table 600. Thus, the digital document clustering system 102 stores the hash value 606 and a document signature 602 as an entry in the hash table 600.

As illustrated in FIG. 6, in some embodiments, the digital document clustering system 102 generates the same hash value for different document signatures corresponding to different digital documents. In particular, by generating the hash values based on a subset of token values from the document signatures, the digital document clustering system 102 can generate the same hash values for digital documents with the same or different document signatures if the subset of token values in each document signature matches. For example, if two document signatures have the same first two token values, the digital document clustering system 102 generates equal hash values. Two different documents having the same hash values indicates that the documents have at least some similar content (e.g., both document signatures begin with token values "di11or_ag09nt").

In alternative embodiments, the digital document clustering system 102 generates a list of digital documents based on document signatures. For example, the digital document clustering system 102 can sort the token values in the document signatures of the document signatures according to frequency of occurrence of the corresponding character strings in the digital documents. The digital document clustering system 102 can also sort the document signatures within a list according to the beginning values of the document signatures (e.g., alphabetically based on the first token values). The digital document clustering system 102 can thus generate a list including a plurality of sorted document signatures based on the beginning token values of the document signatures.

Figure 7:
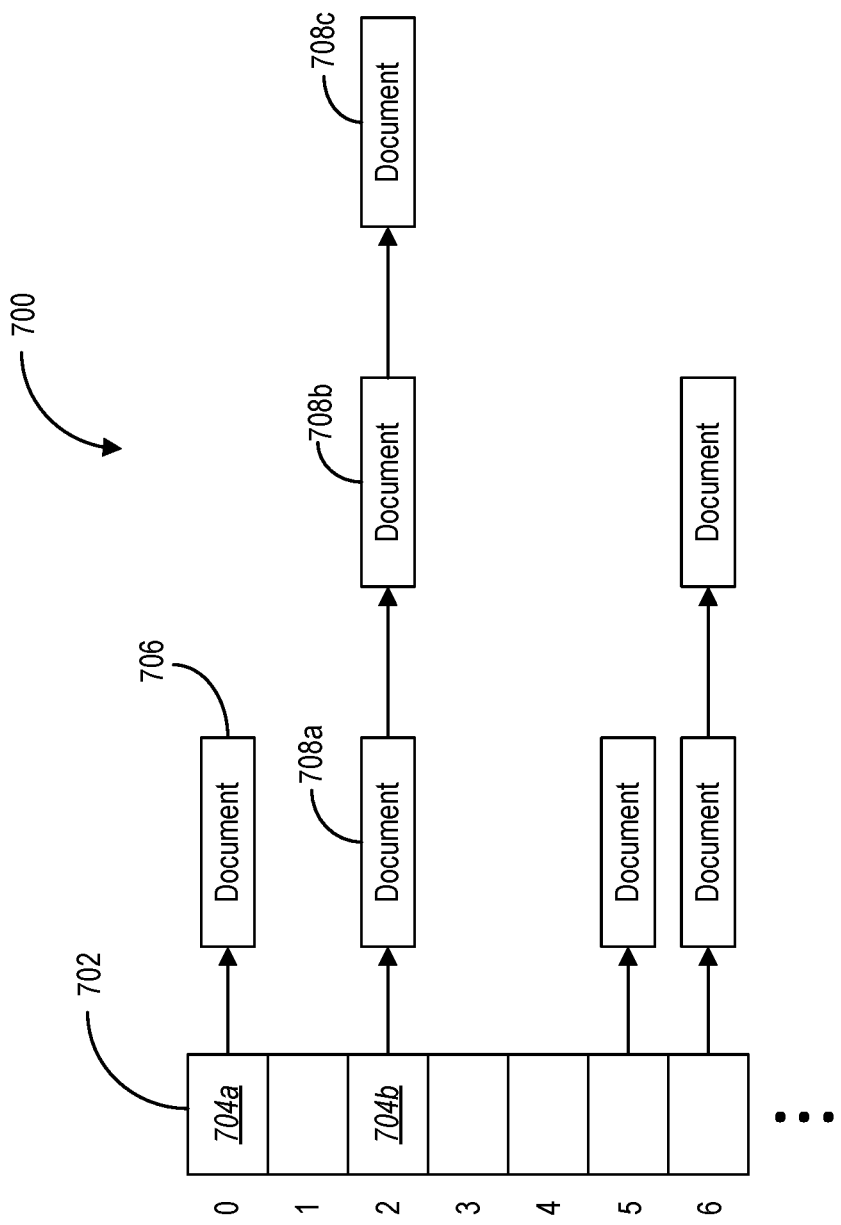
FIG. 7 illustrates an example of the digital document clustering system generating a linked list of digital documents in accordance with one or more implementations.

In connection with generating a hash table corresponding to document signatures of digital documents, the digital document clustering system 102 can also generate a linked list for the digital documents. Specifically, as illustrated in FIG. 7, the digital document clustering system 102 can generate a linked list 700 based on a plurality of entries in a hash table 702. For example, the digital document clustering system 102 generates a link between a hash value in the hash table 702 and a corresponding document. To illustrate, the digital document clustering system 102 links each of the hash values to one or more digital documents based on the hash values generated from the document signatures of the digital documents.

As an example, the digital document clustering system 102 generates a link between a first hash value 704a and a document 706. More specifically, the digital document clustering system 102 inserts a document location corresponding to the document 706 into a list entry associated with the first hash value 704a. In an additional example, the digital document clustering system 102 determines that a plurality of documents 708a-708c correspond to a second hash value 704b. As previously mentioned, document signatures can have the same hash value if they share the same token values in signature portions that the digital document clustering system 102 uses to generate hash values. Accordingly, the digital document clustering system 102 can link the documents 708a-708c to the second hash value 704b using corresponding document locations.

Figure 8:
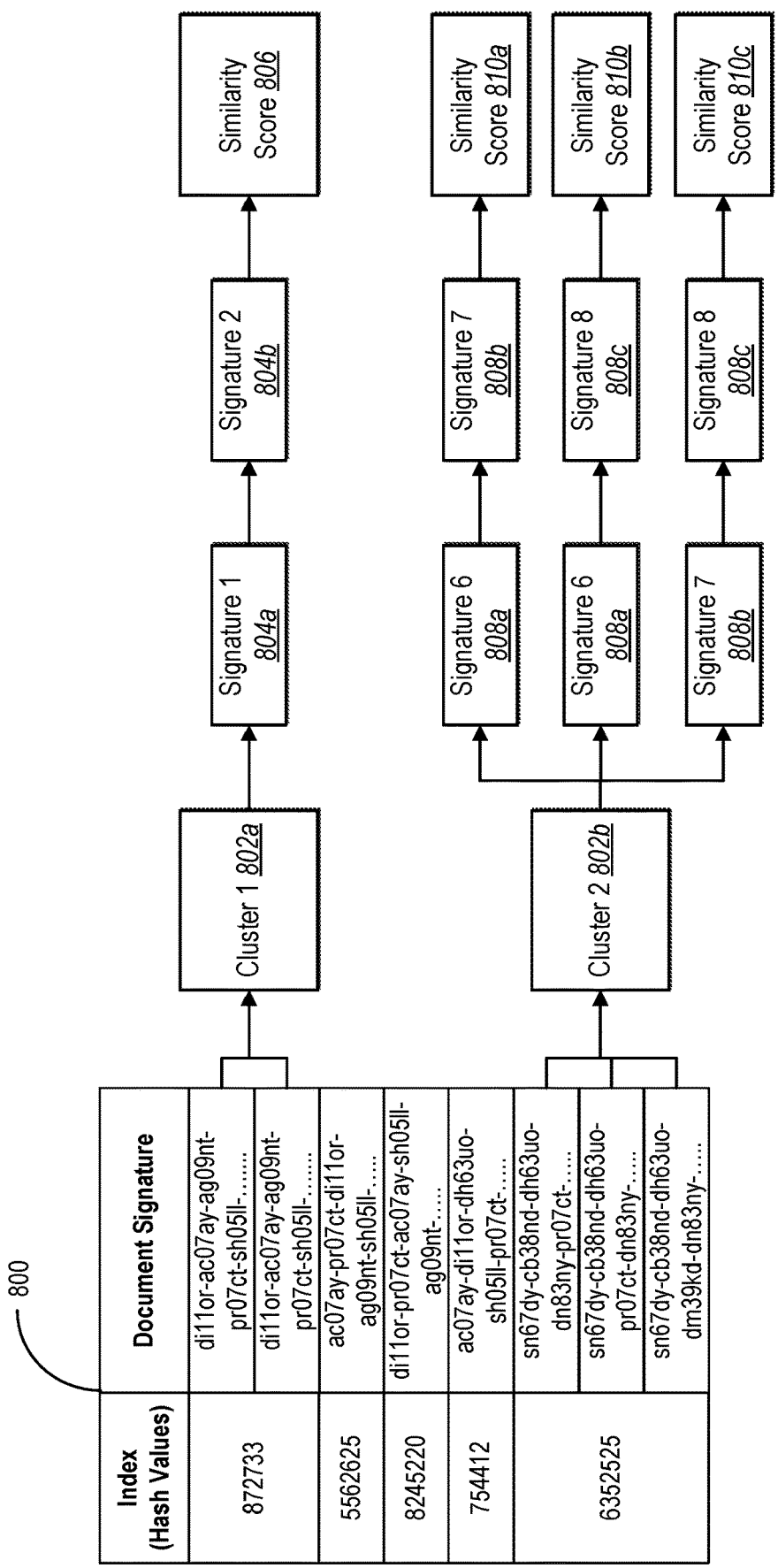
FIG. 8 illustrates an example of the digital document clustering system determining similarities of digital documents in clusters of digital documents in accordance with one or more implementations.

In one or more embodiments, the digital document clustering system 102 clusters digital documents based on hash values in a hash table. FIG. 8 illustrates the digital document clustering system 102 determining a plurality of clusters of similar digital documents based on a hash table 800. In particular, the digital document clustering system 102 determines a plurality of clusters of digital documents (e.g., a first cluster 802a and a second cluster 802b) based on the hash table 800. For example, the digital document clustering system 102 determines that two or more digital documents share the same hash value and generate a cluster of similar digital documents in response to the digital documents sharing the same hash value. Accordingly, the hash value effectively represents a first similarity threshold for determining whether to cluster a set of digital documents.

In additional embodiments, the digital document clustering system 102 performs additional operations to further determine similarity levels of digital documents within clusters. For example, as illustrated in FIG. 8, the digital document clustering system 102 compares pairs of document signatures of digital documents within a given cluster to determine similarity scores for the pairs of document signatures. To illustrate, the digital document clustering system 102 identifies a first document signature 804a and a second document signature 804b corresponding to the first cluster 802a.

The digital document clustering system 102 can also compare the first document signature 804a to the second document signature 804b to generate a similarity score 806 indicating a similarity level between the corresponding digital documents based on the similarity of the corresponding document signatures. For instance, the digital document clustering system 102 determines whether the document signatures are exactly the same, similar, or not similar. In one or more embodiments, the similarity score 806 includes a percentage of token values that match between the first document signature 804a and the second document signature 804b (e.g., 75%, 90%, 100%). In response to determining the similarity of the document signatures, the digital document clustering system 102 generates the similarity score 806. FIG. 9 and the corresponding description provide additional detail associated with determining a similarity of two document signatures.

In one or more embodiments, as illustrated in FIG. 8, the digital document clustering system 102 also compares document signatures in the second cluster 802b. The digital document clustering system 102 compares a plurality of document signatures 808a-808c in the second cluster 802b to generate a plurality of similarity scores 810a-810c. In particular, the digital document clustering system 102 determines three different pair combinations of document signatures based on the hash table 800. As shown, the digital document clustering system 102 generates the similarity scores 810a-810c for pairs of document signatures including a sixth document signature 808a, a seventh document signature 808b, and a third document signature 808c.

FIG. 9 illustrates an example of a comparison diagram 900 that indicates similarity levels of digital documents based on document signatures. Specifically, the comparison diagram 900 indicates whether two different digital documents are the same, very similar, similar, or not similar based on a comparison of corresponding document signatures. For example, the digital document clustering system 102 determines whether the top N tokens and/or the bottom N tokens are the same or similar and whether the bottom N tokens are the same are similar across two document signatures. In response to determining that the top N tokens and the bottom N tokens are the same, the digital document clustering system 102 can determine that the digital documents are either the same (e.g., include the same content) or very similar. In one or more embodiments, the digital document clustering system 102 determines whether the digital documents are the same or very similar in response to determining whether a word count and/or a character count in the document signatures are the same or similar (e.g., within a threshold).

In response to determining that the top N tokens and/or the bottom N tokens are not exactly the same, the digital document clustering system 102 can determine whether the top N tokens and/or the bottom N tokens are within a threshold similarity level. In particular, the digital document clustering system 102 can determine that all of the top N tokens are the same in each document signature and a portion of the bottom N tokens are the same in each document signature. Alternatively, the digital document clustering system 102 can determine that all of the bottom N tokens are the same and a portion of the top N tokens are the same in each document signature. In response to determining that the portions of the document signature meet a similarity threshold (but not equal or below an additional similarity threshold), the digital document clustering system 102 determines that the document signatures (and corresponding digital documents) are similar.

In additional embodiments, the digital document clustering system 102 determines that a pair of document signatures are not similar based according to the comparison diagram 900. Specifically, the digital document clustering system 102 determines that the top N tokens and/or the bottom N tokens of the document signatures do not meet a similarity threshold (e.g., less than 20% of the top N tokens and/or the bottom N tokens). The digital document clustering system 102 can thus determine that the document signatures (and corresponding digital documents) are not similar. In some embodiments, in response to determining that the top N tokens and/or the bottom N tokens of two different document signatures are not the same, the digital document clustering system 102 can skip the step of determining whether the word count and/or character count are the same.

In one or more embodiments, in connection with generating similarity scores for pairs of digital documents in clusters of similar digital documents, the digital document clustering system 102 can determine one or more digital documents for additional operations. FIG. 10 illustrates a similarity matrix 1000 that includes similarity scores for pairs of digital documents in a cluster of similar digital documents. For example, as shown, the digital document clustering system 102 determines that one or more pairs of digital documents are the same (i.e., include the same content) based on corresponding document signatures, other pairs of digital documents are partially similar, and yet other pairs of digital documents are not similar.

The digital document clustering system 102 can utilize the similarity matrix 1000 to perform additional operations based on the similarity scores, such as performing direct document comparisons (e.g., via cosine similarity), content identification, content redaction/modification, or document deduplication. In one or more embodiments, the digital document clustering system 102 provides digital documents to one or more devices for display to allow one or more users of the devices to view similar digital documents. Additionally, in one or more embodiments, the digital document clustering system 102 provides a hash table, similarity scores, and/or other indications of similar digital documents to a third-party system.

Figure 11:
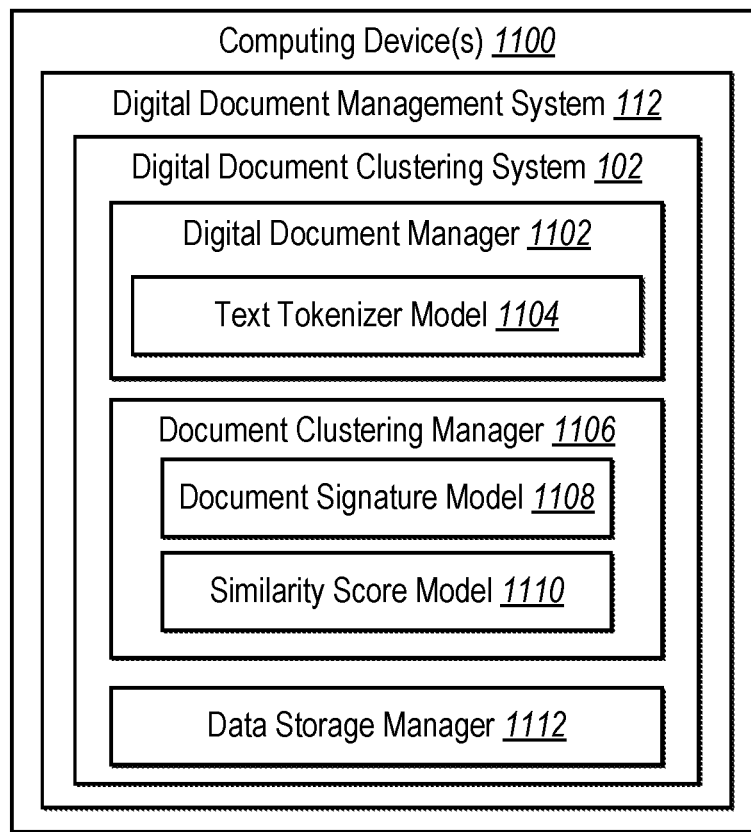
FIG. 11 illustrates an example computing device including the digital document clustering system of FIG. 1 in accordance with one or more implementations.

FIG. 11 illustrates a detailed schematic diagram of an embodiment of the digital document clustering system 102 described above. As shown, the digital document clustering system 102 is implemented in an digital document management system 112 on computing device(s) 1100 (e.g., a client device and/or server device as described in FIG. 1, and as further described below in relation to FIG. 13). Additionally, the digital document clustering system 102 includes, but is not limited to, a digital document manager 1102 that includes a text tokenizer model 1104, a document clustering manager 1106 that includes a document signature model 1108 and a similarity score model 1110, and a data storage manager 1112. The digital document clustering system 102 can be implemented on any number of computing devices. For example, the digital document clustering system 102 can be implemented in a distributed system of server devices for processing electronic requests. The digital document clustering system 102 can also be implemented within one or more additional systems. Alternatively, the digital document clustering system 102 can be implemented on a single computing device such as a single server device.

In one or more embodiments, each of the components of the digital document clustering system 102 is in communication with other components using any suitable communication technologies. Additionally, the components of the digital document clustering system 102 are capable of being in communication with one or more other devices including tenant computing systems, server devices (e.g., cloud storage devices), licensing servers, or other devices/systems. It will be recognized that although the components of the digital document clustering system 102 are shown to be separate in FIG. 11, any of the subcomponents may be combined into fewer components, such as into a single component, or divided into more components as may serve a particular implementation. Furthermore, although the components of FIG. 11 are described in connection with the digital document clustering system 102, at least some of the components for performing operations in conjunction with the digital document clustering system 102 described herein may be implemented on other devices within the environment.

In some embodiments, the components of the digital document clustering system 102 include software, hardware, or both. For example, the components of the digital document clustering system 102 include one or more instructions stored on a computer-readable storage medium and executable by processors of one or more computing devices (e.g., the computing device(s) 1100). When executed by the one or more processors, the computer-executable instructions of the digital document clustering system 102 cause the computing device(s) 1100 to perform the operations described herein. Alternatively, the components of the digital document clustering system 102 can include hardware, such as a special purpose processing device to perform a certain function or group of functions. Additionally, or alternatively, the components of the digital document clustering system 102 can include a combination of computer-executable instructions and hardware.

Furthermore, the components of the digital document clustering system 102 performing the functions described herein with respect to the digital document clustering system 102 may, for example, be implemented as part of a stand-alone application, as a module of an application, as a plug-in for applications, as a library function or functions that may be called by other applications, and/or as a cloud-computing model. Thus, the components of the digital document clustering system 102 may be implemented as part of a stand-alone application on a computing device or a server device. Alternatively, or additionally, the components of the digital document clustering system 102 may be implemented in any application that provides or utilizes a shared process infrastructure.

The digital document clustering system 102 includes a digital document manager 1102 to manage digital documents. For example, the digital document manager 1102 accesses digital documents including text from one or more sources and extracts character strings (e.g., text words) from the digital documents. Additionally, the digital document manager 1102 tokenizes the character strings in the digital documents by utilizing the text tokenizer model 1104.

The digital document clustering system 102 also includes a document clustering manager 1106 that determines clusters of similar digital documents. The document clustering manager 1106 utilizes the document signature model 1108 to generate document signatures representing the content of the digital documents. Specifically, the document signature model 1108 utilizes the document signature model 1108 to generate the document signatures by combining tokens generated from the digital document manager 1102 into token sequences.

Additionally, the document clustering manager 1106 determines similarity levels of digital documents. For example, the document clustering manager 1106 utilizes the similarity score model 1110 to generate similarity scores for pairs of digital documents in clusters of similar digital documents. To illustrate, the document clustering manager 1106 utilizes the similarity score model 1110 to generate similarity scores indicating similarities between digital documents based on the similarities of the corresponding document signatures.

The digital document clustering system 102 also includes a data storage manager 1112 (that comprises a non-transitory computer memory/one or more memory devices) that stores and maintains data associated with processing digital documents. For example, the data storage manager 1112 stores data associated with comparing text content of digital documents. To illustrate, the data storage manager 1112 stores character strings, tokenized character strings, document signatures, clusters of similar digital documents, and similarity scores.

Figure 12:
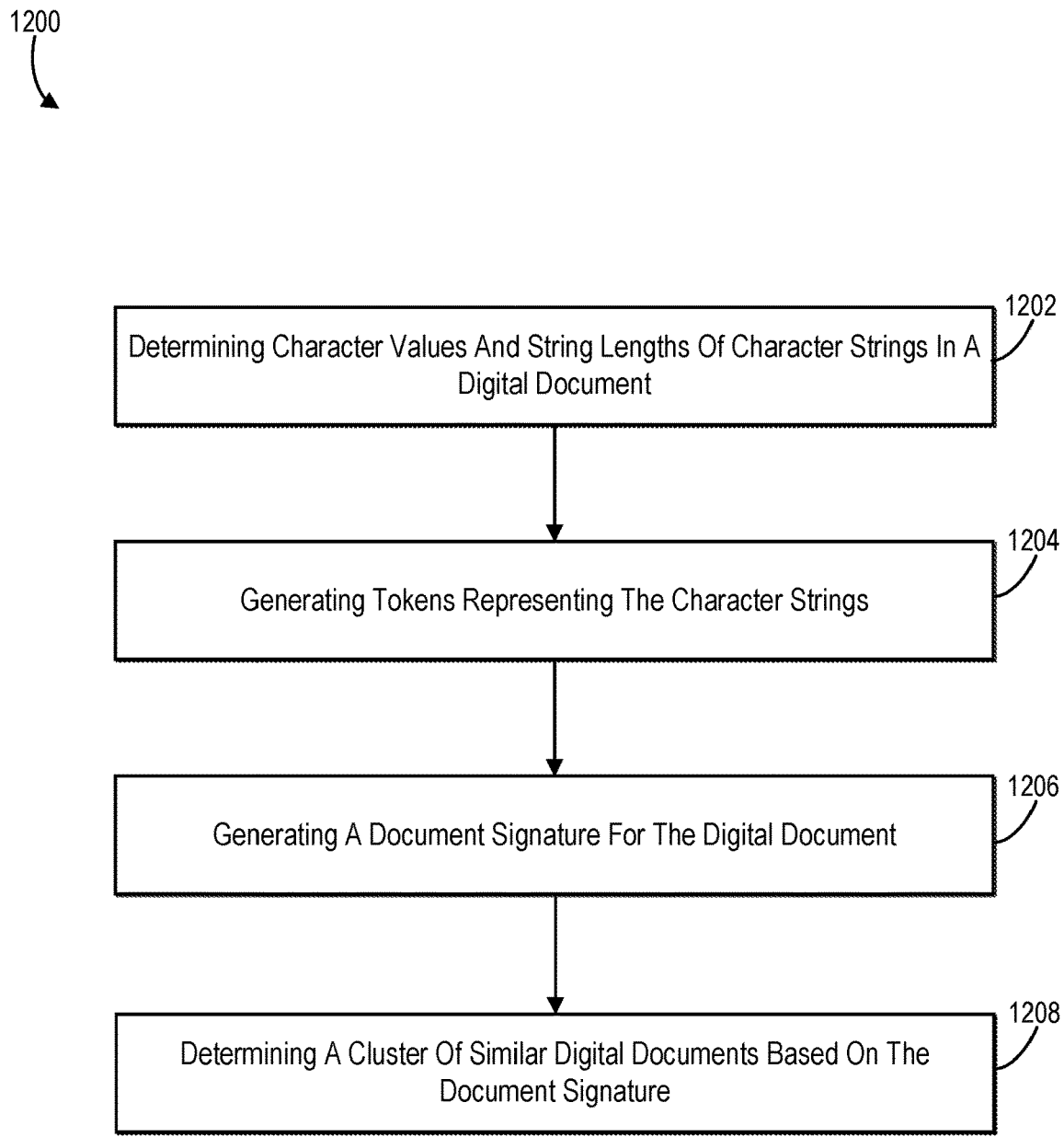
FIG. 12 illustrates an example flowchart of a series of acts for clustering digital documents using document signatures in accordance with one or more implementations.

Turning now to FIG. 12, this figure shows a flowchart of a series of acts 1200 of clustering digital documents using document signatures. While FIG. 12 illustrates acts according to one embodiment, alternative embodiments may omit, add to, reorder, and/or modify any of the acts shown in FIG. 12. The acts of FIG. 12 can be performed as part of a method. Alternatively, a non-transitory computer readable medium can comprise instructions, that when executed by one or more processors, cause a computing device to perform the acts of FIG. 12. In still further embodiments, a system can perform the acts of FIG. 12.

As shown, the series of acts 1200 includes an act 1202 of determining character values and string lengths of character strings in a digital document. For example, act 1202 involves determining, utilizing digital text processing (e.g., one or more operations described above with respect to FIGS. 3 and 5A), character values and string lengths of a plurality of character strings in a digital document of a plurality of digital documents. In one or more embodiments, the digital document clustering system 102 performs act 1102, as described above with respect to FIGS. 3 and 5A.

Act 1202 can involve determining a first set of character values in a beginning portion of a character string of the plurality of character strings. Act 1202 can also involve determining a second set of character values in an ending portion of the character string. Act 1202 can involve determining a string length of the character string based on a number of characters in the character string.

The series of acts 1200 also includes an act 1204 of generating tokens representing the character strings. For example, act 1204 involves generating a plurality of tokens representing the plurality of character strings by combining the character values and the string lengths of the plurality of character strings. In one or more embodiments, the digital document clustering system 102 performs act 1204, as described above with respect to FIGS. 3 and 5A.

Act 1204 can involve determining one or more character values comprising a set of characters in a beginning portion of a character string of the plurality of character strings. Act 1204 can also involve determining a string length of the character string. Act 1204 can further involve generating, for the character string, a token based on the set of characters and the string length of the character string. Act 1204 can also involve determining an additional set of characters in an ending portion of the character string and appending the additional set of characters after the string length. Act 1204 can involve determining first two characters of the character string and determining last two characters of the character string. Additionally, act 1204 can involve generating the token for the character string comprises appending the string length to the set of characters.

Additionally, the series of acts 1200 includes an act 1206 of generating a document signature for the digital document. For example, act 1206 involves generating a document signature for the digital document by combining one or more subsets of tokens of the plurality of tokens into a token sequence. In one or more embodiments, the digital document clustering system 102 performs act 1206, as described above with respect to FIGS. 2, 3, and 5B.

Act 1206 can involve arranging the plurality of tokens in an order according to a frequency of occurrence of the plurality of character strings in the digital document. Act 1206 can involve arranging the plurality of tokens according to frequency of occurrence of corresponding character strings within the digital document. Act 1206 can also involve determining the one or more subsets of tokens by selecting a predetermined number of tokens of the plurality of tokens based on the frequency of occurrence. Act 1206 can also involve selecting the one or more subsets of tokens based on the order of the plurality of tokens.

Act 1206 can involve determining a subset of tokens corresponding to character strings having a first set of frequencies of occurrence in the digital document above a frequency threshold. Act 1206 can further involve generating the token sequence by concatenating the subset of tokens into the token sequence. Act 1206 can also involve determining an additional subset of tokens corresponding to character strings having a second subset of frequencies of occurrence in the digital document below the frequency threshold. Additionally, act 1206 can involve generating the token sequence by concatenating the additional subset of tokens with the subset of tokens in the token sequence.

Act 1206 can involve selecting a predetermined number of tokens by determining a first subset of tokens comprising highest numbers of instances in the digital document and determining a second subset of tokens comprising lowest numbers of instances in the digital document. Act 1206 can also involve concatenating the predetermined number of tokens by concatenating the first subset of tokens and the second subset of tokens into the token sequence.

Act 1206 can involve determining a word count and a character count for the digital document based on the plurality of character strings. Act 1206 can also involve generating the document signature by combining the one or more subsets of tokens with the word count and the character count. For example, act 1206 can involve concatenating the first set of character values, the string length, and the second set of character values.

Also, the series of acts 1200 includes an act 1208 of determining a cluster of similar digital documents based on the document signature. For example, act 1208 involves determining a cluster of similar digital documents comprising the digital document by comparing the document signature to a plurality of document signatures corresponding to the plurality of digital documents. In one or more embodiments, the digital document clustering system 102 performs act 1208, as described above with respect to FIGS. 2, 4, and 8.

Act 1208 can involve generating a linked list comprising the plurality of digital documents based on the plurality of document signatures corresponding to the plurality of digital documents. Act 1208 can also involve determining the cluster of similar digital documents comprising the digital document based on the linked list.

Act 1208 can involve determining a similarity between a first document signature of a first digital document and a second document signature of a second digital document by comparing token values in the first document signature to token values in the second document signature. Act 1208 can also involve determining that the first digital document and the second digital document are similar in response to determining that the similarity between the first document signature and the second document signature meet a similarity threshold.

Act 1208 can involve generating, by comparing document signatures of the plurality of document signatures, a similarity index comprising similarity scores for pairs of digital documents of the plurality of digital documents. Act 1208 can also involve determining the cluster of similar digital documents comprising the digital document in response to one or more similarity scores for pairs of digital documents comprising the digital document meeting a similarity threshold.

The series of acts 1200 can include generating a hash table comprising the plurality of tokens representing the plurality of character strings based on the plurality of document signatures. The series of acts 1200 can also include generating a linked list comprising the plurality of digital documents within the hash table based on the plurality of document signatures and a plurality of document locations of the plurality of digital documents. The series of acts 1200 can include determining the cluster of similar digital documents comprising the digital document by comparing one or more token values of the plurality of document signatures.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
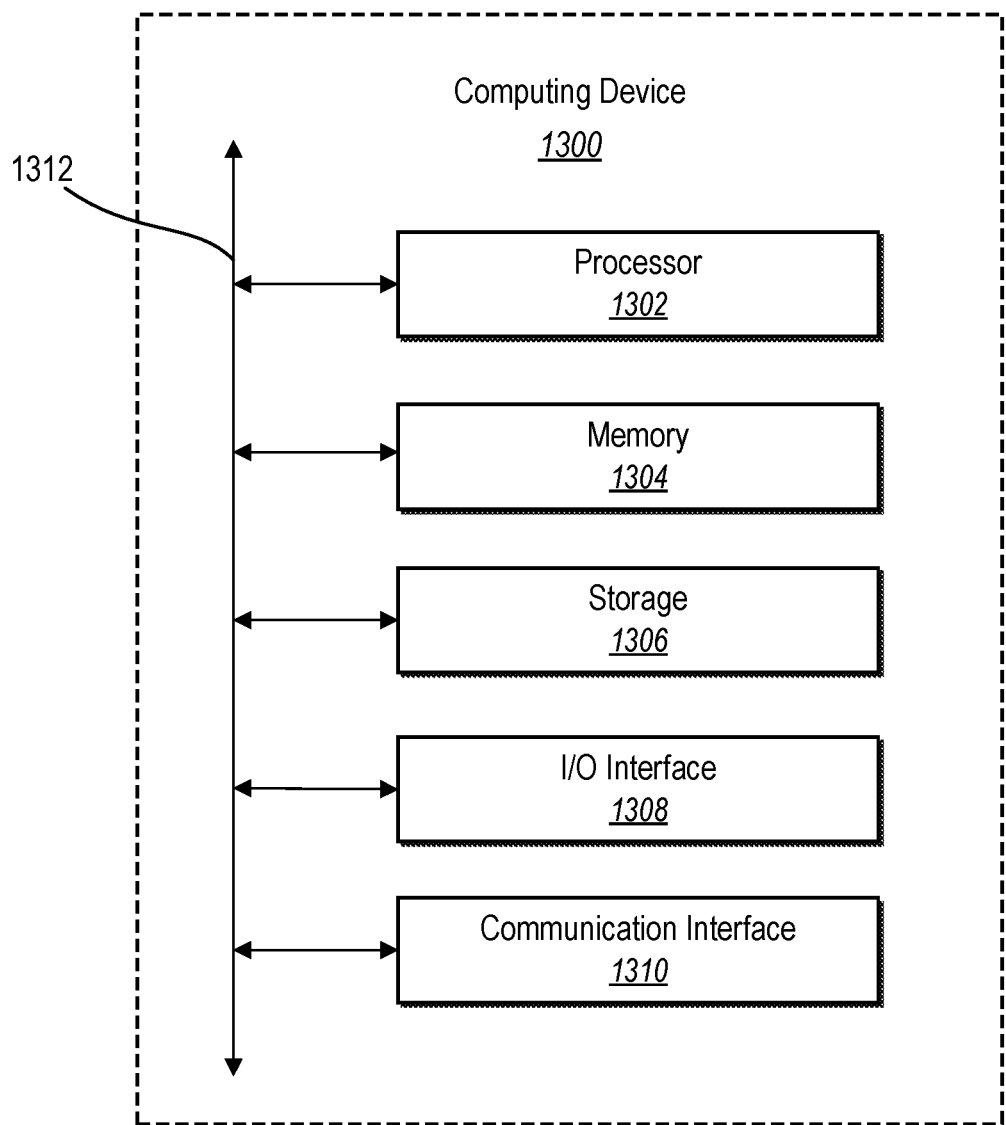
FIG. 13 illustrates an example of a computing device in accordance with one or more implementations.

FIG. 13 illustrates a block diagram of exemplary computing device 1300 that may be configured to perform one or more of the processes described above. One will appreciate that one or more computing devices such as the computing device 1300 may implement the system(s) of FIG. 1. As shown by FIG. 13, the computing device 1300 can comprise a processor 1302, a memory 1304, a storage device 1306, an I/O interface 1308, and a communication interface 1310, which may be communicatively coupled by way of a communication infrastructure 1312. In certain embodiments, the computing device 1300 can include fewer or more components than those shown in FIG. 13. Components of the computing device 1300 shown in FIG. 13 will now be described in additional detail.

In one or more embodiments, the processor 1302 includes hardware for executing instructions, such as those making up a computer program. As an example, and not by way of limitation, to execute instructions for dynamically modifying workflows, the processor 1302 may retrieve (or fetch) the instructions from an internal register, an internal cache, the memory 1304, or the storage device 1306 and decode and execute them. The memory 1304 may be a volatile or non-volatile memory used for storing data, metadata, and programs for execution by the processor(s). The storage device 1306 includes storage, such as a hard disk, flash disk drive, or other digital storage device, for storing data or instructions for performing the methods described herein.

The I/O interface 1308 allows a user to provide input to, receive output from, and otherwise transfer data to and receive data from computing device 1300. The I/O interface 1308 may include a mouse, a keypad or a keyboard, a touch screen, a camera, an optical scanner, network interface, modem, other known I/O devices or a combination of such I/O interfaces. The I/O interface 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1308 is configured to provide graphical data to a display for presentation to a user. The graphical data may be representative of one or more graphical user interfaces and/or any other graphical content as may serve a particular implementation.

The communication interface 1310 can include hardware, software, or both. In any event, the communication interface 1310 can provide one or more interfaces for communication (such as, for example, packet-based communication) between the computing device 1300 and one or more other computing devices or networks. As an example, and not by way of limitation, the communication interface 1310 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1310 may facilitate communications with various types of wired or wireless networks. The communication interface 1310 may also facilitate communications using various communication protocols. The communication infrastructure 1312 may also include hardware, software, or both that couples components of the computing device 1300 to each other. For example, the communication interface 1310 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The invention claimed is:

1. A computer-implemented method comprising:
   generating, by at least one processor utilizing digital text processing, a plurality of tokens representing a plurality of character strings from a digital document of a plurality of digital documents stored at a digital content database by:
      determining, for a character string of the plurality of character strings, a plurality of character values of the character string;
      determining a string length of the character string; and
      generating, for the character string, a token comprising the plurality of character values and the string length of the character string;
   generating, by the at least one processor, a document signature for the digital document by combining one or more subsets of tokens of the plurality of tokens into a token sequence; and
   determining, by the at least one processor accessing the plurality of digital documents stored at the digital content database, a cluster of similar digital documents comprising the digital document by comparing the document signature to a plurality of document signatures corresponding to the plurality of digital documents.

2. The computer-implemented method of claim 1, wherein determining the plurality of character values comprises:
   determining a set of characters in a beginning portion of the character string.

3. The computer-implemented method of claim 2, wherein generating the token for the character string comprises appending the string length to the set of characters.

4. The computer-implemented method of claim 3, wherein generating the token for the character string further comprises:
   determining an additional set of characters in an ending portion of the character string; and
   appending the additional set of characters after the string length.

5. The computer-implemented method of claim 4, wherein:
   determining the set of characters in the beginning portion comprises determining first two characters of the character string; and
   determining the additional set of characters in the ending portion comprises determining last two characters of the character string.

6. The computer-implemented method of claim 1, wherein generating the document signature comprises:
   arranging the plurality of tokens in an order according to a frequency of occurrence of the plurality of character strings in the digital document; and
   selecting the one or more subsets of tokens based on the order of the plurality of tokens.

7. The computer-implemented method of claim 6, wherein generating the document signature further comprises:
   determining a subset of tokens corresponding to character strings having a first subset of frequencies of occurrence in the digital document above a frequency threshold; and
   generating the token sequence by concatenating the subset of tokens into the token sequence.

8. The computer-implemented method of claim 7, wherein generating the document signature comprises:
   determining an additional subset of tokens corresponding to character strings having a second subset of frequencies of occurrence in the digital document below the frequency threshold; and
   generating the token sequence by concatenating the additional subset of tokens with the subset of tokens into the token sequence.

9. The computer-implemented method of claim 1, wherein generating the document signature comprises:
   determining a word count and a character count for the digital document based on the plurality of character strings; and
   generating the document signature by combining the one or more subsets of tokens with the word count and the character count.

10. The computer-implemented method of claim 1, wherein determining the cluster of similar digital documents comprises:
    generating a linked list comprising the plurality of digital documents based on the plurality of document signatures corresponding to the plurality of digital documents; and
    determining the cluster of similar digital documents comprising the digital document based on the linked list.

11. The computer-implemented method of claim 10, wherein determining the cluster of similar digital documents comprises:
    determining a similarity between a first document signature of a first digital document and a second document signature of a second digital document by comparing token values in the first document signature to token values in the second document signature; and
    determining that the first digital document and the second digital document are similar in response to determining that the similarity between the first document signature and the second document signature meet a similarity threshold.

12. A system comprising:
    one or more processors configured to cause the system to:
    determine, utilizing digital text processing, character values and string lengths of a plurality of character strings in a digital document of a plurality of digital documents stored at a digital content database by determining the string lengths representing numbers of characters in corresponding character strings of the digital document;
    generate a plurality of tokens representing the plurality of character strings by combining the character values and the string lengths of the plurality of character strings;
    generate a document signature for the digital document by combining one or more subsets of tokens of the plurality of tokens into a token sequence; and
    determine, by accessing the plurality of digital documents stored at the digital content database, a cluster of similar digital documents comprising the digital document by comparing the document signature to a plurality of document signatures corresponding to the plurality of digital documents.

13. The system of claim 12, wherein the one or more processors are further configured to cause the system to determine the character values and the string lengths of the plurality of character strings by:
    determining a first set of character values in a beginning portion of a character string of the plurality of character strings;
    determining a second set of character values in an ending portion of the character string; and
    determining a string length of the character string based on a number of characters in the character string.

14. The system of claim 13, wherein the one or more processors are further configured to cause the system to generate, for the character string, a token by concatenating the first set of character values, the string length, and the second set of character values.

15. The system of claim 12, wherein the one or more processors are further configured to cause the system to generate the document signature by:
    arranging the plurality of tokens according to frequency of occurrence of corresponding character strings within the digital document;
    determining the one or more subsets of tokens by selecting a predetermined number of tokens of the plurality of tokens based on the frequency of occurrence; and
    concatenating the predetermined number of tokens into the token sequence.

16. The system of claim 15, wherein the one or more processors are further configured to cause the system to:
    select the predetermined number of tokens by:
    determining a first subset of tokens comprising highest numbers of instances in the digital document; and
    determining a second subset of tokens comprising lowest numbers of instances in the digital document; and
    concatenate the predetermined number of tokens by concatenating the first subset of tokens and the second subset of tokens into the token sequence.

17. The system of claim 12, wherein the one or more processors are further configured to cause the system to:
- generate a hash table comprising the plurality of tokens representing the plurality of character strings based on the plurality of document signatures;
- generate a linked list comprising the plurality of digital documents within the hash table based on the plurality of document signatures and a plurality of document locations of the plurality of digital documents; and
- determine the cluster of similar digital documents comprising the digital document by comparing one or more token values of the plurality of document signatures.

18. A non-transitory computer readable storage medium comprising instructions that, when executed by at least one processor, cause a computing device to perform operations comprising:
- generating, utilizing digital text processing, a plurality of tokens representing a plurality of character strings from a digital document of a plurality of digital documents stored at a digital content database by:
  - determining, for a character string of the plurality of character strings, a plurality of character values of the character string;
  - determining a string length of the character string; and
  - generating, for the character string, a token comprising the plurality of character values and the string length of the character string;
- generating, by the at least one processor, a document signature for the digital document by:
  - arranging the plurality of tokens in an order according to frequency of occurrence in the digital document; and
  - combining one or more subsets of tokens of the plurality of tokens into a token sequence based on the order of the plurality of tokens; and
- determining, by the at least one processor accessing the plurality of digital documents stored at the digital content database, a cluster of similar digital documents comprising the digital document by comparing the document signature to a plurality of document signatures corresponding to the plurality of digital documents.

19. The non-transitory computer readable storage medium of claim 18, wherein generating the plurality of tokens comprises:
- determining the plurality of character values of the character string by determining a plurality of sets of character values of a plurality of portions of the character string; and
- concatenating the plurality of sets of character values and the string length within a token for the character string.

20. The non-transitory computer readable storage medium of claim 18, wherein determining the cluster of similar digital documents comprises:
- generating, by comparing document signatures of the plurality of document signatures, a similarity index comprising similarity scores for pairs of digital documents of the plurality of digital documents; and
- determining the cluster of similar digital documents comprising the digital document in response to one or more similarity scores for pairs of digital documents comprising the digital document meeting a similarity threshold.

* * * * *